(12) United States Patent
Nagamatsu

(10) Patent No.: US 7,751,682 B2
(45) Date of Patent: Jul. 6, 2010

(54) CONTENT PROCESSING DEVICE, CONTENT PROCESSING METHOD, CONTROL PROGRAM, AND STORAGE MEDIUM

(75) Inventor: Takayuki Nagamatsu, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1164 days.

(21) Appl. No.: 11/362,059

(22) Filed: Feb. 27, 2006

(65) Prior Publication Data

US 2007/0180487 A1 Aug. 2, 2007

(30) Foreign Application Priority Data

Feb. 2, 2006 (JP) ............... 2006-026355

(51) Int. Cl.
H04N 7/00 (2006.01)
H04N 5/93 (2006.01)
(52) U.S. Cl. ......................... 386/46; 386/52
(58) Field of Classification Search .............. 386/46, 386/124, 125, 52, 94, 95
See application file for complete search history.

(56) References Cited

U.S. PATENT DOCUMENTS

| 5,377,051 A * | 12/1994 | Lane et al. .................... 386/81 |
| 2002/0146235 A1 | 10/2002 | Watanabe et al. |
| 2005/0114214 A1 | 5/2005 | Itoh |

FOREIGN PATENT DOCUMENTS

| EP | 1079623 A1 | 2/2001 |
| JP | 11-003088 A | 1/1999 |
| JP | 2001-069415 A | 3/2001 |
| JP | 2001-086015 A | 3/2001 |
| JP | 2001-266482 A | 9/2001 |
| JP | 2002-300524 A | 10/2002 |
| JP | 2002-314912 A | 10/2002 |
| JP | 2003-153203 A | 5/2003 |
| JP | 2003-242289 * | 8/2003 |
| JP | 2003-248639 A | 9/2003 |
| JP | 2004-080447 A | 3/2004 |
| JP | 2004-328244 A | 11/2004 |
| JP | 2005-122075 A | 5/2005 |
| JP | 2005-156996 A | 6/2005 |
| WO | WO-00/40021 | 7/2000 |

* cited by examiner

*Primary Examiner*—Robert Chevalier
(74) *Attorney, Agent, or Firm*—Birch, Stewart, Kolasch & Birch, LLP

(57) ABSTRACT

A digital television in accordance with the present invention includes: a state sensing section and a state information update section. The state sensing section senses the process execution state of a process target content in a process executed in accordance with user manipulation. The state information update section updates, in accordance with a sensed process execution state, content state information based on which processing of at least one of the process target content and related content relevant to the process target content is controlled. Therefore, the television does not require the user to perform complex manipulation, but is still capable of controlling content processing.

17 Claims, 11 Drawing Sheets

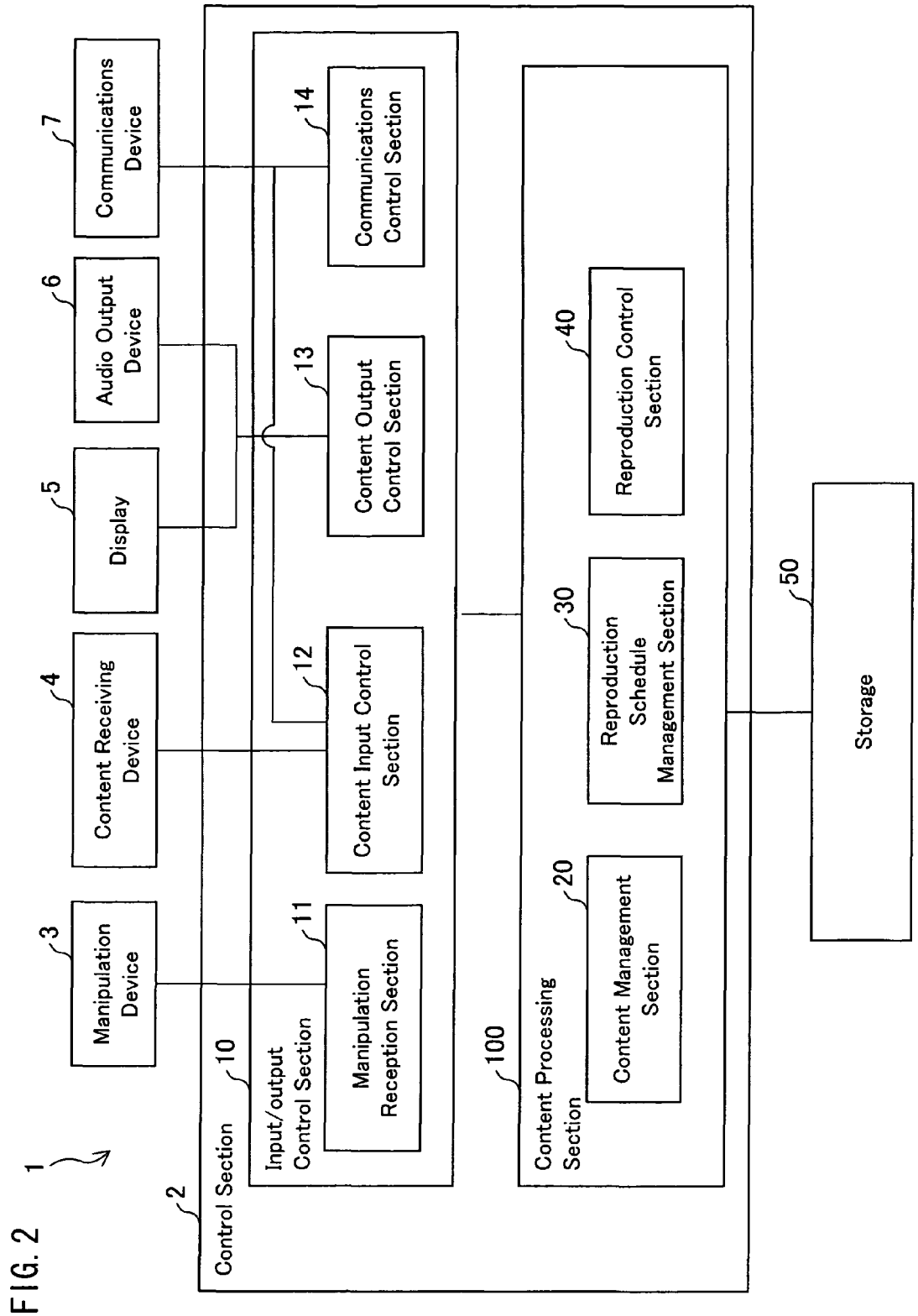

FIG. 3

| ID | Attribute | Content | Content State Info. |
|---|---|---|---|
| C01M01 | C01 | Content CM1 | Reproduction Permitted |
| C01M02 | C01 | Content CM2 | Reproduction Forbidden |
| C01M03 | C01 | Content CM3 | Reproduction Permitted |
| C01M04 | C01 | Content CM4 | Reproduction Forbidden |
| C02M01 | C02 | Content C-5 | Reproduction Forbidden |
| C02M02 | C02 | Content C-6 | Reproduction Permitted |
| C02M03 | C02 | Content C-7 | Reproduction Forbidden |
| D01M01 | D01 | Content D-1 | Reproduction Permitted |
| E01M01 | E01 | Content E-1 | Reproduction Permitted |
| F01M01 | F01 | Content F-1 | Reproduction Permitted |
| G01M01 | G01 | Content G-1 | Reproduction Permitted |
| G01M02 | G01 | Content G-2 | Reproduction Forbidden |
| H01M01 | H01 | Content H-1 | Reproduction Permitted |
| I01M01 | I01 | Content I-1 | Reproduction Permitted |
| J01M01 | J01 | Content J-1 | Reproduction Permitted |
| K01M01 | K01 | Content K-1 | Reproduction Permitted |
| L01M01 | L01 | Content L-1 | Reproduction Permitted |
| M01M01 | M01 | Content M-1 | Reproduction Permitted |
| M01M02 | M01 | Content M-2 | Reproduction Permitted |
| N01M01 | N01 | Content N-1 | Reproduction Permitted |
| N01M02 | N01 | Content N-2 | Reproduction Permitted |

FIG. 8

| Time Slot | Recorded Content Channel 1 | Recorded Content Channel 2 |
|---|---|---|
| 19:00 to 20:00 | Content K—1 | Content CM1 |
| | Content CM3 | Content M—1 |
| | Content D—1 | |
| | Content E—1 | |
| 20:00 to 21:00 | Content L—1 | Content D—1 |
| | | Content C—6 |
| | | Content N—1 |
| | Content F—1 | |
| | Content G—1 | Content J—1 |

CONTENT PROCESSING DEVICE, CONTENT PROCESSING METHOD, CONTROL PROGRAM, AND STORAGE MEDIUM

This nonprovisional application claims priority under 35 U.S.C. §119(a) on Patent Application No. 2006-26355 filed in Japan on Feb. 2, 2006, the entire contents of which are hereby incorporated by reference.

FIELD OF THE INVENTION

The present invention relates to a content processing device, content processing method, control program, and storage medium which updates information based on which content reproduction is controlled.

BACKGROUND OF THE INVENTION

Conventionally, people often record a television broadcast (content) on a video tape or other storage medium to replay and watch it after the broadcast time. Mass storage media are recently popular in line with widespread use of hard disk recorders and DVD recorders as well as video tapes. Large numbers of television programs can be recorded on these mass storage media once the programs are digitized, allowing the user to replay and watch the recorded television programs when convenient to the user. This kind of mass recording of digitized content happens not only with television broadcast programs, but with content distributed over the Internet and content distributed to mobile terminals.

However, the large recorded content may contain unnecessary parts to the user. In addition, there may be some parts which are preferably replayed in a fixed order. For example, a content provider wants the user to watch advertisement content in such an order that the content produces desirable effect to the ad supplier. In contrast, the user, or content consumer, wants to watch dramas and similar content which are divided into successive episodes in a fixed order, for example.

Accordingly, Japanese Unexamined Patent Publication 2000-261742 (Tokukai 2000-261742; published Sep. 22, 2000) discloses a receiver which, in response to user manipulation, allows the user to make replay order and repeat count settings for desired fragment data (content). Content reproduction is thus controllable for each piece of fragment data in accordance with user manipulation.

Japanese Unexamined Patent Publication 2002-230946 (Tokukai 2002-230946; published Aug. 16, 2002) discloses an information reproduction device which searches recorded information data segments (content) for those which match a search query entered by the user. The device generates order information based on which the matched information data segments will be reproduced continuously in a predetermined order specified by the user. The replay order is determined in accordance with user manipulation. The user can watch the content in the desired order.

These Tokukai 2000-261742 and 2002-230946 devices are very complex to operate because the user has to specify which reproduction method is to be applied to which part of the content (fragment data or information data segment) and instruct setting changes.

Specifically, on the Tokukai 2000-261742 receiver, the user needs to specify the fragment data to be updated and change reproduction method settings for each piece of fragment data.

On the Tokukai 2002-230946 information reproduction device, to specify the information data segment to be updated, the user needs to enter a search query. Pinpointing desired information data segments becomes increasingly difficult as the information data segments contained in the storage medium grow in number. Accordingly, the user will be required to do extra work.

SUMMARY OF THE INVENTION

The present invention has an objective to provide a recorded content processing device, content processing method, control program, and storage medium which allows the user to control content processing without requiring complex user manipulation in relation to content reproduction control.

A content processing device in accordance with the present invention, to solve the problems, is characterized in that it is a content processing device for managing content stored for reproduction and includes: a state sensing section for sensing a process execution state of a first piece of content in a process executed in accordance with user manipulation; and a state information update section for updating, in accordance with the process execution state sensed by the state sensing section, content state information based on which processing of at least one of the first piece of content and a second piece of content relevant to the first piece of content is controlled.

According to the configuration, when the user manipulates the content processing device, the content processing device executes content processing in accordance with the manipulation. The target content for this processing will be referred to as content A. The state sensing section senses a state (process execution state) of content A in a process executed by the content processing device.

As the state sensing section senses a predetermined process execution state of content A, the state information update section updates the content state information of at least one of content A and other content (related content) relevant to content A, based on a predetermined information update procedure.

Accordingly, if the user wants to alter settings for content reproduction control, the user can update the content state information on content reproduction control without directly sending a setting altering command and without a manipulation to specify the content for which settings are to be altered. Therefore, the user is not required to perform separate complex manipulation, but still able to update the content state information of content at a suitable timing and in a suitable manner to the substance when the user enters a command to process the content.

A content processing method in accordance with the present invention, to solve the problems, is characterized in that it is a content processing method executed by a content processing device for managing content stored for reproduction and includes the steps of: (a) sensing a process execution state of a first piece of content in a process executed in accordance with user manipulation; and (b) updating, in accordance with the process execution state sensed in step (a), content state information based on which processing of at least one of the first piece of content and a second piece of content relevant to the first piece of content is controlled.

According to the method, an updating process for content state information of a suitable substance is automatically executed at a suitable timing in accordance with the execution state of processing executed on content in response to the user manipulation.

Therefore, the user can implement, with for example a "reproduce content A" operation, a content processing method in which the content processing device executes a suitable update process on the content state information. Conventionally, to update content state information in relation to such content process control, the user needed to manually: (1) input commands to start updating of content state information; (2) specify the content which is to be updated; and (3) commands as to how the content state information of the content should be updated. In addition, the content state information in relation to reproduction control of other, relevant content can be fine tuned in accordance with user manipulation.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 2 is a schematic block diagram illustrating the configuration of a digital television of the present embodiment.

FIG. 3 shows an example of the content in a content storage, the attribute information of the content, and the content state information contained in a content state information storage.

FIG. 8 shows an example of the reproduction schedule, for the content contained in the content storage, which is recorded in a reproduction schedule storage.

DESCRIPTION OF THE EMBODIMENTS

Embodiment 1

Figure 1:
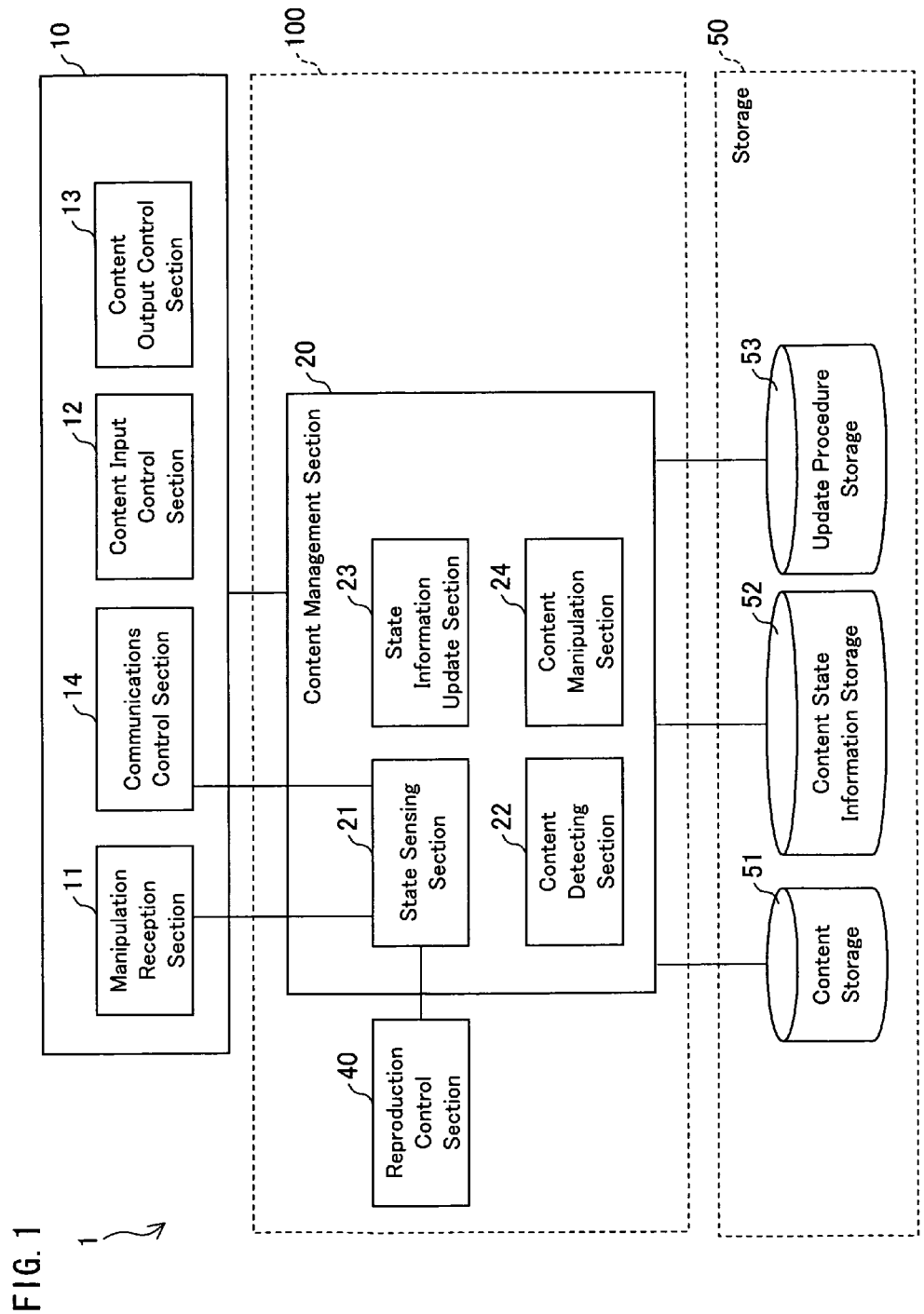
FIG. 1 is a block diagram illustrating the configuration of a major part of a digital television in relation to an embodiment of the present invention.

In the present embodiment, a content processing device in accordance with the present invention is applied to a digital television which receives terrestrial digital broadcasting as an example.

Assume that the digital television of the present embodiment capable of reception of content (programs) transmitted on a broadcast signal from a broadcasting station or digital content delivered over a communications network. Furthermore, the television is capable of storing content received on a built-in storage medium.

In the figures referred to in the following description, the same members are indicated by the same reference numerals. The same members also share the same names and functions. Their detailed description will not be repeated.

(Brief Description of Digital Television 1)

FIG. 2 is a schematic block diagram illustrating the configuration of a digital television 1 in accordance with the present embodiment. The digital television 1 includes, as shown in FIG. 2, a control section 2, a manipulation device 3, a content receiving device 4, a display 5, an audio output device 6, a communications device 7, and a storage 50.

The storage 50 contains programs executed by the control section 2 and various data for retrieval by the control section 2 in content management and reproduction control. Details of the control section 2 and the storage 50 will be given later.

The manipulation device 3 is signal input means enabling the user to input signals based on which the digital television 1 operates. In the present embodiment, the device 3 is for example a remote controller for remote manipulation, physically separate from the digital television 1, or alternatively manipulation buttons built in the digital television 1. If the manipulation device 3 is a remote controller, the digital television 1 includes light-receiving means (not shown) which, on the receiving end (light-receiving section end), receives command signals (for example, infrared signals) generated from key manipulation on the manipulation device (remote controller) 3. The command signals received by the light-receiving means are sent to the control section 2.

The commands entered by the user through the manipulation device 3 for content processing include content reproduction commands, erase commands, and access commands with which the user can access a URL and other information contained in the content. Another such command, if the content is realized by bidirectional communications, would be a purchase command which the user issues while content is being reproduced so that he/she can purchase the commercial goods presented in the content, for example. Further examples would include content reproduction manipulation commands, such as fast forward, rewind, and stop.

The content receiving device 4 receives content (programs) transmitted on broadcast signals from broadcasting stations. In a case like this, the content receiving device 4 includes a tuner, a demodulator section, a TS (transport stream) decoder, etc. After demodulation and decoding, content data is stored in the storage 50.

The communications device 7 receives content delivered from an external device over a communications network constituted by the Internet, an LAN (local area network). etc. There are by no means any particular limitations as to how the content must be delivered. For example, the device 7 may receive content delivered by a multicast scheme whereby the same content data is delivered to a plurality of specified recipients. Alternatively, the device 7 may receive content delivered by a broadcast scheme whereby the same content data is delivered to a plurality of unspecified recipients. The device 7 may also access an external storage device to retrieve content. The retrieved content data is stored in the storage 50.

The content obtained by the content receiving device 4 and the communications device 7 may be not only television programs delivered via a wire or wirelessly and video-centered content stored in a storage medium, but also includes radio programs and music-centered content such as music provided in a similar manner.

In other words, the "content" in this description refers to general multimedia content provided in various forms through various media including broadcast and communications networks.

The display 5 outputs video (moving image, still images) data in the content. The display 5 may be, for example, a display, such as an LCD (liquid crystal display), a PDP (plasma display panel), or a CRT (cathode-ray tube). The audio output device 6 may be a speaker outputting audio data in the content.

The control section 2 controls the operation of the digital television 1. The control section 2 retrieves various programs from the storage 50 in order to control the sections and members realizing the functions of a content processing device in accordance with the present invention and perform content management and reproduction control and other processes. The control section 2 includes inside thereof an input/output control section 10 and a content processing section 100.

The input/output control section 10 in the control section 2 controls information input/output between those sections in the digital television 1 (manipulation device 3, content receiving device 4, display 5, audio output device 6, and communications device 7) and the content processing section 100 in the control section 2. The input/output control section 10 includes a manipulation reception section 11, a content input control section 12, a content output control section 13, and a communications control section 14.

The manipulation reception section 11 receives user manipulation command signals for the content which are input by the user through the manipulation device 3 and sends the signals to the content processing section 100. Accordingly, the digital television 1 is able to execute a process on specified content in accordance with the user manipulation.

The content input control section 12 receives the content received by the content receiving device 4 or the communications device 7 and stores the incoming content into the storage 50.

When the content processing section 100 reproduces content contained in the storage 50, the content output control section 13 outputs video data in the content to the display 5 and/or audio data to the audio output device 6. Therefore, the user can enjoy the video content displayed on the display 5 and the music content output from the audio output device 6.

The communications control section 14 controls communications between the digital television 1 and external devices. Specifically, for example, when the section 14 has received from the user a command to download distributed content, the section 14 controls the communications device 7 to obtain the content.

The content processing section 100 in the control section 2 receives, via the input/output control section 10, the user command signals entered through the manipulation device 3 and the content obtained from the content receiving device 4, etc. to execute various processing on the content. The content processing section 100 includes therein a content management section 20, a reproduction schedule management section 30, and a reproduction control section 40 in order to realize a content processing device in accordance with the present invention in the digital television 1.

The content management section 20 manages content and information related to the content concerning reproduction control ("content state information"). This is termed [1] content management function. The reproduction schedule management section 30 manages a reproduction schedule specifying, for example, the time when content reproduction is started so that the content contained in the storage 50 is reproduced in a suited manner. This is termed [2] reproduction schedule management function. The reproduction control section 40 reproduces predetermined piece of content in response to user manipulation or based on the reproduction schedule generated by the reproduction schedule management section 30. This is termed [3] content reproduction function.

The following will describe the storage 50 and the members and sections in the content processing section 100 in further detail.

(Configuration of Digital Television 1)

[1] Content Management Function

FIG. 1 is a block diagram illustrating the configuration of a major part of the content management section 20 in the digital television 1 in accordance with the present embodiment. As shown in FIG. 1, the content management section 20 includes inside thereof a state sensing section 21, a content detecting section 22, a state information update section 23, and a content manipulation section 24. The storage 50 includes a content storage 51, a content state information storage 52, and an update procedure storage 53.

The state sensing section 21 senses one of process execution states when the digital television 1 performs a process on content contained in the content storage 51 in accordance with user manipulation. More specifically, first, the section 21 identifies the content which was/will be subjected to a sensed process ("process target content"). Second, the section 21 senses how the process target content (first piece of content) is being processed by the digital television 1 (process execution state).

Concrete examples of the process execution states of the process target content sensed by the state sensing section 21 would include: a state where reproduction of the process target content has been started in accordance with a reproduction command from the user; a state where the reproduction of the process target content has been ended; a state where an access to a URL (uniform resource locator) in the process target content is started; a state where, when the process target content is a mail-order TV/radio program, a payment process to purchase the commercial goods advertised in the content has been completed; and a state where a transmission of answers to a quiz or questionnaire presented in the content has been completed. The types of process execution states sensed are not limited to these examples. Various execution states of content processing are possible depending on the types of processes the digital television 1 can perform.

The content detecting section 22 detects the content related to the process target content identified by the state sensing section 21 ("related content") in the content contained in the content storage 51.

More specifically, for example, in the present embodiment, an "attribute" field is provided in the content storage 51 to store attribute information in relation with each piece of content. Accordingly, the content detecting section 22 can detect the content having the same attribute as the process target content as the related content (second piece of content). If there are two or more pieces of related content, the section 22 may detect them all.

Giving the same attribute to those pieces of content which are highly related to each other enables the content detecting section 22 to suitably detect the pieces of content related to the process target content. The content storage 51 and the attribute information will be detailed later.

The state information update section 23 updates the content state information related to the process target content identified by the state sensing section 21 and the related content detected by the content detecting section 22 in accordance with update rules (information update procedure).

The content state information indicates the state of the content related to reproduction control. The content state information may be, for example, a binary digit indicative of whether to permit or forbid reproduction of the content, information indicative of whether to erase content in the content storage 51, or information indicative of whether to immediately reproduce the content.

The types of updated content state information are not limited to these examples. Various content state information is possible depending on the types of processes the digital television 1 can perform.

The content state information that is updated by the state information update section 23 may be only the process target content or only the related content for one or more pieces of process target content.

The update rules are information defining the content state information of which content is updated in what way when which content is in which process execution state. The state information update section 23 performs a process which updates the content state information in accordance with the update rules. Assume that the update rules are determined in advance by the content provider (or the user) and contained in the update procedure storage 53. Alternatively, the update rules may be externally provided along with distributed content. The update rules for the update procedure storage 53 will be detailed later.

The content manipulation section 24 manipulates the content on the basis of the content state information updated by the state information update section 23. For example, suppose that the content state information of content C has been updated to 'erase data.' In such cases, the content manipulation section 24 erases content C from the content storage 51.

By suitably identifying and immediately erasing the content determined unnecessary or the content determined unfit for reproduction in such a manner, the content that should not be reproduced is prevented from being reproduced, and the portion of the content storage 51 occupied by the content is freed.

If the content state information is updated to 'proceed to reproduce,' the content manipulation section 24 instructs the reproduction control section 40 to immediately reproduce the content related to the content state information.

Now, the information on the content contained in the content storage 51 and the content state information of the content contained in the content state information storage 52 will be described.

FIG. 3 shows an example of the content in the content storage 51, the attribute information of the content, and the content state information contained in the content state information storage 52. FIG. 3 shows the attribute information and the content state information contained respectively in the content storage 51 and the content state information storage 52 in association with the content in a single table ("content table"); this is by no means limiting the data structure of the information actually stored.

Any data structure is possible so long as a set of attribute information and content state information is recorded in association with each piece of content.

As shown in FIG. 3, the content table has four fields: a "content ID" field unambiguously identifying content, a "content" field giving content names (or address-specifying information of content data), an "attribute" field giving content attributes; and a "content state information" field giving content state information of content.

The "attribute" field may not be separately provided. For example, the first three digits of the content ID may be allocated to give the attribute of the content so that the content ID can be utilized as attribute information.

Categorizing the content using the attribute information and giving the same attribute to those pieces of content which are highly related to each other in such a manner enables the content detecting section 22 to suitably detect the pieces of content related to the process target content.

The attribute information is a group identifier to categorize content into groups on the basis of the relationship and continuation of the substance of the content. For example, pieces of advertisement content promoting certain commercial goods may be given an identical attribute. Further, the same drama content may be given an identical attribute.

The attribute information may be determined in advance by the content provider. In a case like this, it becomes possible to schedule those pieces of content which are related with each other so that the content may be reproduced effectively in the order and at the times as intended by the content provider. Alternatively, a GUI may be provided to allow a setup operation where the user can define and give an attribute to any piece of the content. In a case like this, it becomes possible to schedule the content in the order and at the times that the user likes.

The example in FIG. 3 shows only two types of content state information: 'reproduction permitted' and 'reproduce forbidden.' This is by no means limiting the types of content state information. For example, the table may contain 'erase data,' 'proceed to reproduce,' and other states as well.

Next, the update rules contained in the update procedure storage 53 will be described based on the concrete example shown in FIG. 4.

Figure 4:
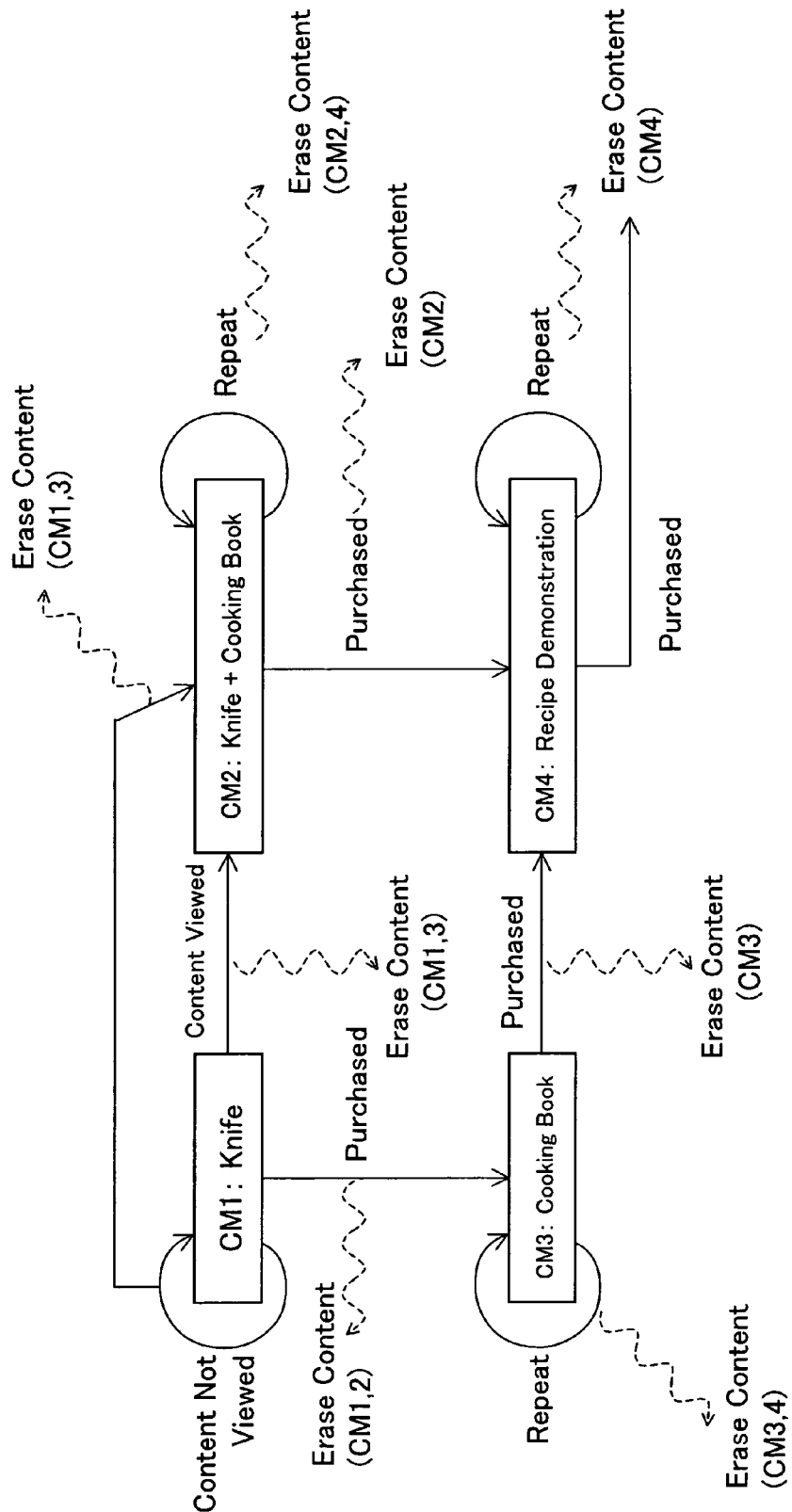
FIG. 4 illustrates a content reproduction scenario where a content provider delivers a series of advertisements to sell kitchen knives via mail order.

FIG. 4 illustrates a content reproduction scenario where a mail-order business owner (i.e., content provider) delivers a series of advertisements to sell commercial goods (a kitchen knife) via mail order.

The content provider prepares the following four pieces of content for the purpose of promoting sales of the kitchen knives. The four pieces of content are given the same attribute information.

CM1: Sales promotion content for kitchen knives

CM2: Sales promotion content for kitchen knives (and a notice that a cooking book is given away for free to the purchaser of a kitchen knife)

CM3: Sales promotion content for cooking books

CM4: Sales promotion content for cooking books (recipes are demonstrated)

CM1 targets all the users. CM1 is a piece of content intended to sell a kitchen knife. The users are invited repeatedly (n times) to view the content until they decide to buy the kitchen knife.

CM2 targets the users who viewed CM1, but did not buy and those who were repeatedly (n times) invited to view CM1, but did not view. To encourage them to buy, CM2 additionally includes a notice that a cooking book will be given away for free. It is not desirable if CM2 is viewed by the user who bought a knife upon viewing CM1. We want to prevent those users from viewing CM2.

CM3 targets those who bought a kitchen knife upon viewing CM1, intended to subsequently sell them a cooking book. The users are invited m times to view the content until they decide to buy a cooking book.

CM4 targets those who did not buy after viewing CM2 or CM3 m times. CM4 is a piece of content demonstrating recipes, intended to encourage them to buy a cooking book. CM4 is distributed to the users who bought a cooking book upon viewing CM2 or CM3 as incentive information demonstrating recipes.

Figure 5:
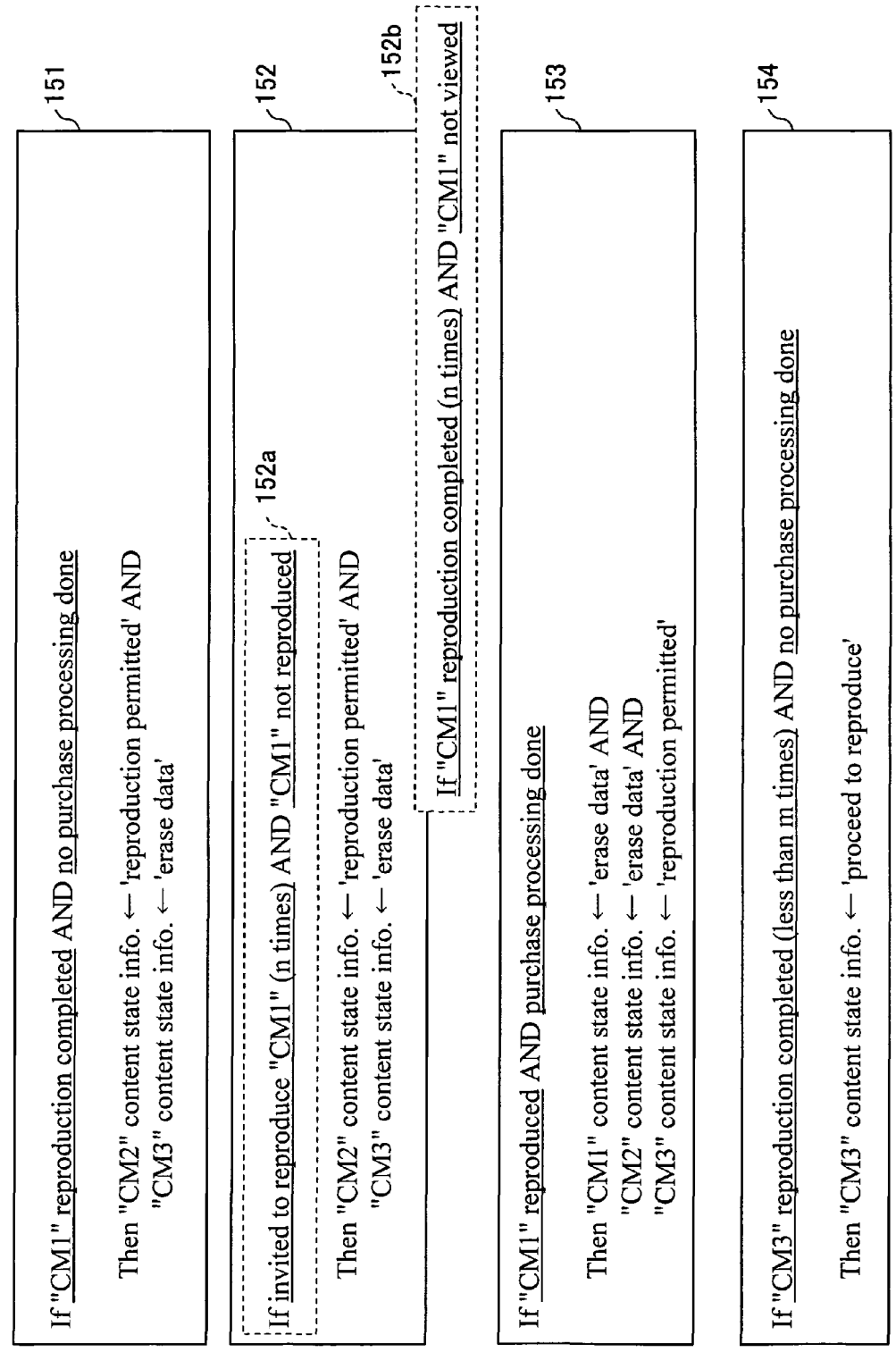
FIG. 5 shows an example of update rules recorded in an update procedure storage.

The content provider wants these four advertisement pieces of content to be reproduced in an order and at times which bring out better promotional effects in accordance with actions of the users. To this end, update rules are established on the basis of the foregoing required specifications. FIG. 5 shows an example of update rules for the FIG. 4 example. The rules are recorded in the update procedure storage 53.

In the update rules 151 to 154, the content name of process target content or related content is indicated by double quotation marks (" . . . "). The content state information to be updated is indicated by single quotation marks (' . . . '). The underlined parts in if-statements are process execution states in the digital television 1, which are the conditions sensed by the state sensing section 21.

The update rule 151 is referred to by the state information update section 23 if the user has viewed CM1 on the digital television 1, but has not bought a kitchen knife.

The state sensing section 21 senses that the digital television 1 has ended reproduction of "CM1" and also that the user has so far entered no purchase command for a kitchen knife. In a case like this, the state information update section 23 updates the content state information of "CM2" to 'reproduction permitted' and the content state information of "CM3" to 'erase data' according to the update rule 151.

Accordingly, the users who did not buy a kitchen knife upon viewing "CM1" can thus be invited to view "CM2" which encourages them to buy a kitchen knife. Accordingly, "CM3," which is designed to sell only the cooking book and now no longer necessary, can be erased from the content storage 51 (FIG. 1).

If "CM1" becomes unnecessary after a single reproduction, the then-statement may contain a procedure to erase or forbid to reproduce "CM1."

In the above description, the state sensing section 21 "senses" that the user has viewed CM1 if CM1 is reproduced on the digital television 1. The invention is not limited to such a method. For example, a monitoring camera (not shown) may be provided near the display 5. The monitoring camera captures a moving image of the user for recognition, to check if the user is viewing the content or not. In a case like this, the state sensing section 21 "senses" that the user has viewed CM1 if, for example, the user has not moved or attentively looked away from the digital television 1 while the digital television 1 is reproducing CM1.

The update rule 152 is referred to when "CM1" is not viewed n times. The if-statement 152a specifies that the user is regarded as having refused to view "CM1" n times if n scheduled reproduction times for CM1 pass without the user entering a reproduction command. The if-statement 152a may be replaced with the if-statement 152b. If, as mentioned earlier, there is provided a monitoring camera to determine whether the user is watching content being reproduced, the state sensing section 21 senses, as in the if-statement 152b, that the user has never viewed the display 5 during the n reproductions of "CM1."

The update rule 153 is referred to when "CM1" has been reproduced and a purchase process for a kitchen knife has been done. There are no particular limitations on how the purchase process is sensed. An access to the content provider's site shown on the display 5 may be sensed. Alternatively, the completion of a payment process by selecting a purchase button, etc. after the access may be sensed.

There are no particular limitations on how the state sensing section 21 determines that the user has purchased commercial goods. For example, the state sensing section 21 may do so by monitoring the history of processing performed in the content in order to know if a purchase button provided in the content has been pressed through the manipulation device 3. Alternatively, the section 21 may have a capability to monitor user actions in more detail to know, for example, if the user has accessed information in the content with an intention to buy, but without actually buying.

The update rule 154 is referred to when the user has viewed "CM3" without buying a cooking book less than m times. If "CM3" has been reproduced less than m times, the state information update section 23 updates the content state information of "CM3" to 'proceed to reproduce' so as to repeatedly reproduce "CM3."

The update rules are not limited by the example shown in FIG. 5. For example, the rules may be recorded as a table in which an update method can be identified using process target content and information which defines processes carried out thereon as a combined key. Alternatively, the rules may define methods of updating the content state information of only either the process target content or the related content.

The update rules may specify the "process target content itself" or identify content using a "content name" or a "content ID."

Referring to these update rules, the state information update section 23 can suitably update the content state information of suitable content at a suitable timing without having to receive a user command every time.

(Content State Information Update Procedure)

Figure 6:
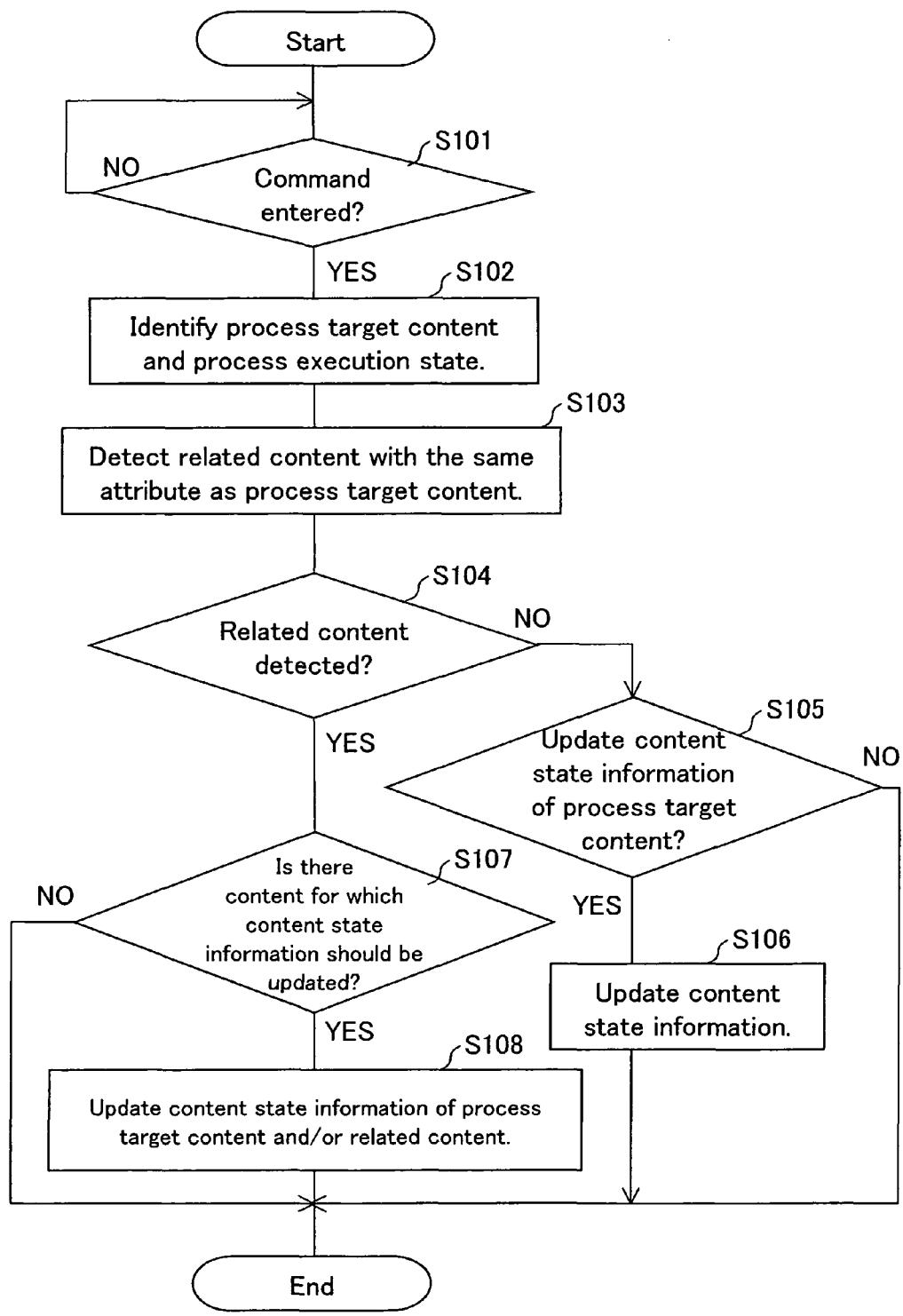
FIG. 6 is a flow chart illustrating a content state information updating process in a digital television of the present embodiment.

FIG. 6 is a flow chart illustrating a content state information updating process in the digital television 1.

The manipulation reception section 11 (FIG. 1) stands by for a command signal which is entered through the manipulation device 3 in relation to the content (S101). When a command signal (for example, a reproduction command for content "CM1") is entered, a process in accordance with the signal is performed (the reproduction control section 40 reproduces "CM1"). The state sensing section 21 monitors the reproduction control section 40, identifies "CM1" as the process target content, and senses the process execution state (for example, reproduction of "CM1" completed without no purchase processing) (S102).

The content detecting section 22 detects related content which has the same attribute as the process target content "CM1" in the content storage 51 (the content table in FIG. 3) (S103). Specifically, since "CM1" has an attribute "CO1," the section 22 detects content with the "CO1" attribute. In the FIG. 3 example, three related pieces of content, "CM2," "CM3," and "CM4," are detected.

Next, the state information update section 23 performs a content state information updating process in accordance with an update rule corresponding to the process execution state sensed by the state sensing section 21 (the update rule 151 (FIG. 5) in this example).

The content detecting section 22 determines whether or not there is related content (S104). If one or more pieces of related content are detected (YES in S104), the section 23 proceeds to steps whereby the content state information of the process target content and/or the related content is updated. If no related content is detected (NO in S104), the section 23 may proceed to steps whereby the content state information of only the process target content is updated.

If no related content is detected, the state information update section 23 determines whether to update the content state information of the process target content itself in accordance with an update rule (S105). To perform an update (YES in S105), the section 23 updates the content state information in accordance with the update rule (S106) before ending the process. If no update is to be done (NO in S105), the section 23 ends the process there.

If related content ("CM2," "CM3," and "CM4") is detected, the state information update section 23 determines the content state information of which piece of content is to be updated in accordance with the update rule 151 (S107). The same determination may be made on the process target content ("CM1"). In the example of the update rule 151 shown in FIG. 3, "CM2" and "CM3" are determined as content needing an update.

The state information update section 23 updates the content state information of the content determined as needing an update in accordance with the update rule (S108). Specifically, the section 23 updates the content state information of "CM2" to 'reproduction permitted' and the content state information of "CM3" to 'erase data.'

After completing the update of all the content state information that should be updated, the section 23 ends the content state information update process.

The update rules may be associated in advance with the process target content so that the state information update section 23 can retrieve them.

(Content Management Based on Updated Content State Information)

Next, a process performed by the content manipulation section 24 after the content state information is updated will be described.

In accordance with whether the state information update section 23 has updated the content state information, the content manipulation section 24 determines whether the content needs be processed.

For example, taking the FIG. 6 example again, since the content state information of "CM2" has been first updated to 'reproduction permitted' in S108, the content manipulation section 24 performs a process to unlock "CM2" which has been locked to forbid reproduction.

Further, since the content state information of "CM3" has been updated to 'erase data,' the content manipulation section 24 performs a process to erase the content data of "CM3" from the content storage 51.

This is by no means limiting the process performed by the content manipulation section 24 based on the content state information. If the content state information has been updated from 'reproduction permitted' to 'reproduction forbidden,' the section 24 may lock the content to forbid reproduction.

As described in the foregoing, according to the method and the configuration of the digital television 1, the digital television 1 performs a process on content in accordance with a user operation on the digital television 1. The state sensing section 21 then senses a process execution state while the digital television 1 is performing a process on process target content.

When the state sensing section 21 has sensed a predetermined process execution state of the process target content, the state information update section 23 updates the content state information of at least either the process target content or the separate related content detected by the content detecting section 22 in accordance with a predetermined update rule identified on the basis of the process execution state of the process target content.

The content state information is always changing. For example, if the user has bought from the content provider a right to reproduce content of which the content state information is 'reproduce forbidden,' the user naturally wants to update the content state information of the content to 'reproduction permitted.' Other possible examples are to forbid reproduction of content whose free trial period has expired and to erase the content which will no longer be reproduced. In these cases, the user will want to update the content state information of the content to 'reproduce forbidden' or 'erase data.'

Considering these situations, it is natural that the optimal content state information of content is constantly changing depending on the environment in which the content is utilized. Therefore, if the user needs to input a command to the digital television 1 to update the content state information every time as is the case with conventional technology, the user will have to perform complex manipulation.

Further, there are a lot of inconveniences if the content state information of individual pieces of content cannot be quickly updated in accordance with changing situations. For example, if settings have been made so that a piece of content that the user has once viewed is reproduced in connection with another piece of content, and the user views the other piece of content reproduced under those settings, the user again sees the content he/she once viewed before. Allowing again the user to view content that he/she once viewed is not desirable in the following situations.

Suppose for example mail-order TV/radio program content containing "content A1" which is advertisement content promoting the purchase of commercial goods A and "content A2" which is advertisement content inviting the purchase of commercial goods A. Presenting "content A1 and A2" to the user who has seen "content A1 and A2" and purchased commercial goods A again does not make any advertisement effect, but rather could offend the user.

Further, effective license management is a difficult issue if content is permitted to view only once.

The state information update section 23 can cope with these problems. The section 23 is capable of dynamically updating the content state information of content in accordance with the content and the way the content has been or is being processed. The section 23 thus updates content state information in relation to content reproduction control to perform suitable reproduction control without the user having to perform complex manipulation. Further, the content detecting section 22 identifies the related content for which the content state information should be updated. The user therefore does not need to specify anew the content for which the content state information is to be updated.

These features enable content reproduction control with no complex manipulation in relation to content reproduction control.

Next, the reproduction schedule management function of the reproduction schedule management section 30 in the content processing section 100 (FIG. 2) will be described in detail.

[2] Reproduction Schedule Management Function

Figure 7:
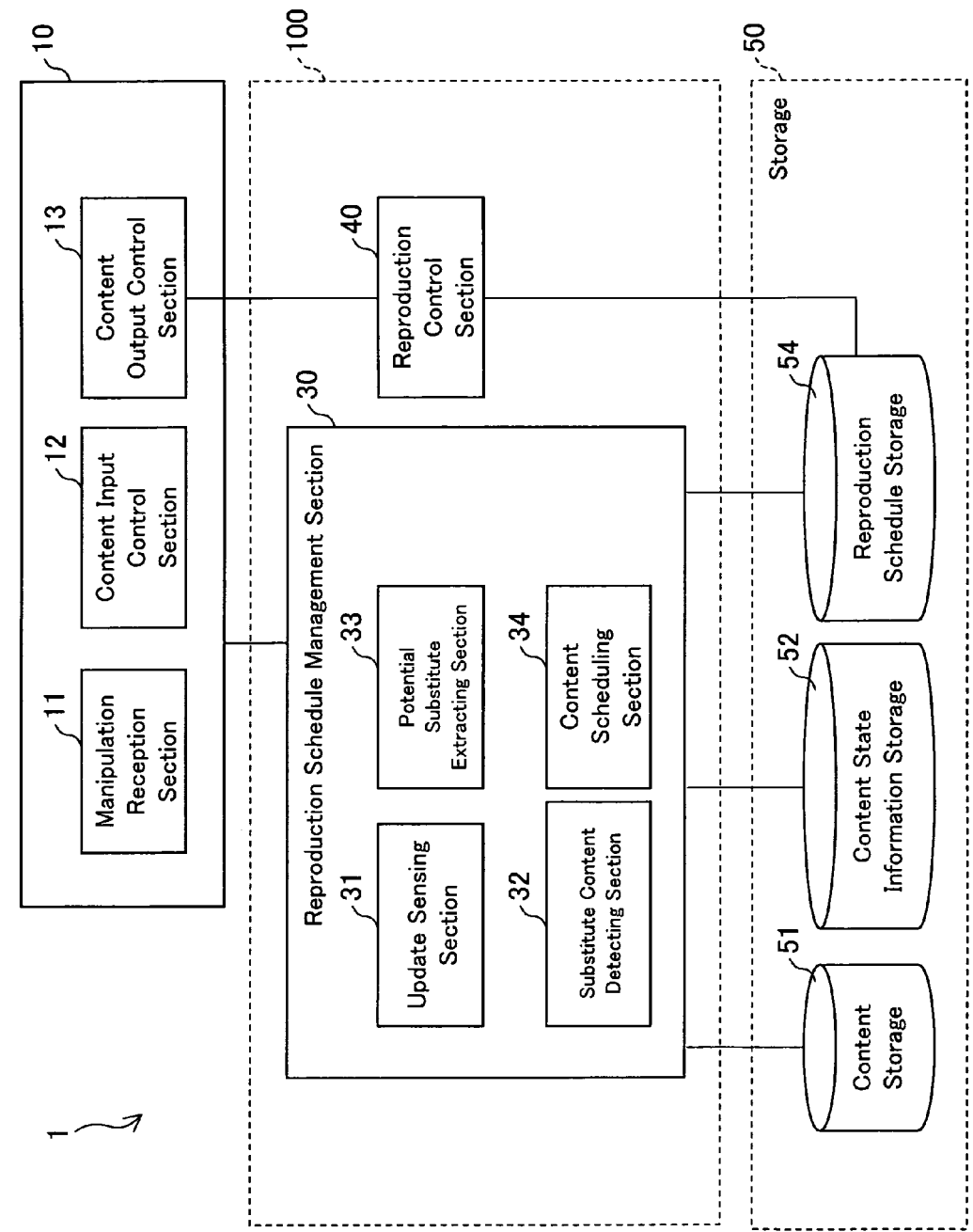
FIG. 7 is a block diagram illustrating the configuration of a major part of a digital television of the present embodiment.

FIG. 7 is a block diagram illustrating the configuration of a major part of the reproduction schedule management section 30 in the digital television 1 in accordance with the present embodiment. As shown in FIG. 7, the reproduction schedule management section 30 includes inside thereof an update sensing section 31, a substitute content detecting section 32, a potential substitute extracting section 33, and a content scheduling section 34. The storage 50 includes a reproduction schedule storage 54.

The update sensing section 31 senses that the content state information of content contained in the reproduction schedule storage 54 have been updated by the state information update section 23 (FIG. 1), in order to start rescheduling of reproduction.

The substitute content detecting section 32 detects in the content storage 51 the content, or "substitute content," that should replace the content determined by the update sensing section 31 as needing to be rescheduled ("rescheduling target content").

In the present embodiment, the content, or substitute content, which has the same attribute as the rescheduling target content (reproduction-forbidden content) is detected as an example. In a case like this, the same actions are performed as the content detecting section 22 in the content management section 20. Therefore, the content detecting section 22 may be used as a substitute content detecting section 32. Accordingly, the configuration becomes simple.

The potential substitute extracting section 33 extracts potential substitute content from content of different attributes using a predetermined query if the substitute content detecting section 32 cannot detect even a single piece of content that has the same attribute as the rescheduling target content.

If the reproduction schedule is not full after the rescheduling of detected content with the same attribute, the potential substitute extracting section 33 may extract content which can be added to the reproduction schedule. It will be detailed later how substitute content is extracted.

The content scheduling section 34 adds the substitute content supplied from the substitute content detecting section 32 and/or the potential substitute extracting section 33 to the reproduction schedule.

Specifically, for example, suppose that the state information update section 23 updates the content state information of "CM3" to 'erase data' and that the content manipulation section 24 erases the content data for "CM3." If the "CM3" has been scheduled for reproduction, the content scheduling section 34 places the substitute content identified above to fill in the position of content "CM3." Accordingly, the reproduction schedule is rearranged.

The rearranged reproduction schedule information is stored again in the reproduction schedule storage 54 or output to an external storage device (not shown).

The reproduction schedule generating method by the reproduction schedule management section 30 is by no means limited in any particular manner. For example, the section 30 may produce a schedule reflecting user preferences so that the content preferred by the user is scheduled for a time slot when the user is most likely to view. There are no limitations on the method to quantify user's content preferences.

Not only the content contained in the content storage 51 is available for scheduling. For example, electronic program schedules forwarded from broadcasting stations may be consulted to know content which will soon be broadcast or delivered. A reproduction schedule may be produced covering both the broadcast/delivered content and the recorded content. FIG. 8 shows an example of the reproduction schedule produced in the reproduction schedule management section 30.

FIG. 8 shows an example of the reproduction schedule, for the content contained in the content storage 51, which is recorded in the reproduction schedule storage 54. The example is a reproduction schedule for one day.

The present embodiment assumes two reproduction-schedule-dedicated channels as an example. The invention is not limited to this. In the reproduction schedule example shown in FIG. 8, a channel and a reproduction time slot are recorded for each piece of content in association with that content.

In the reproduction schedule in FIG. 8, the reproduction time slot is indicated by the length along the vertical axis. Specifically, it would be understood that 50 minutes is reserved for the duration of "content M-1," 40 minutes for that of "content L-1," 30 minutes for that of "content K-1" and "content N-1," and 10 minutes for all the other pieces of content. Therefore, the reproduction starting time for content is also indicated by the position on the vertical axis in the reproduction schedule in which the content is contained.

In the reproduction schedule shown in FIG. 8, no content with content state information 'reproduction forbidden' is scheduled.

Figure 9:
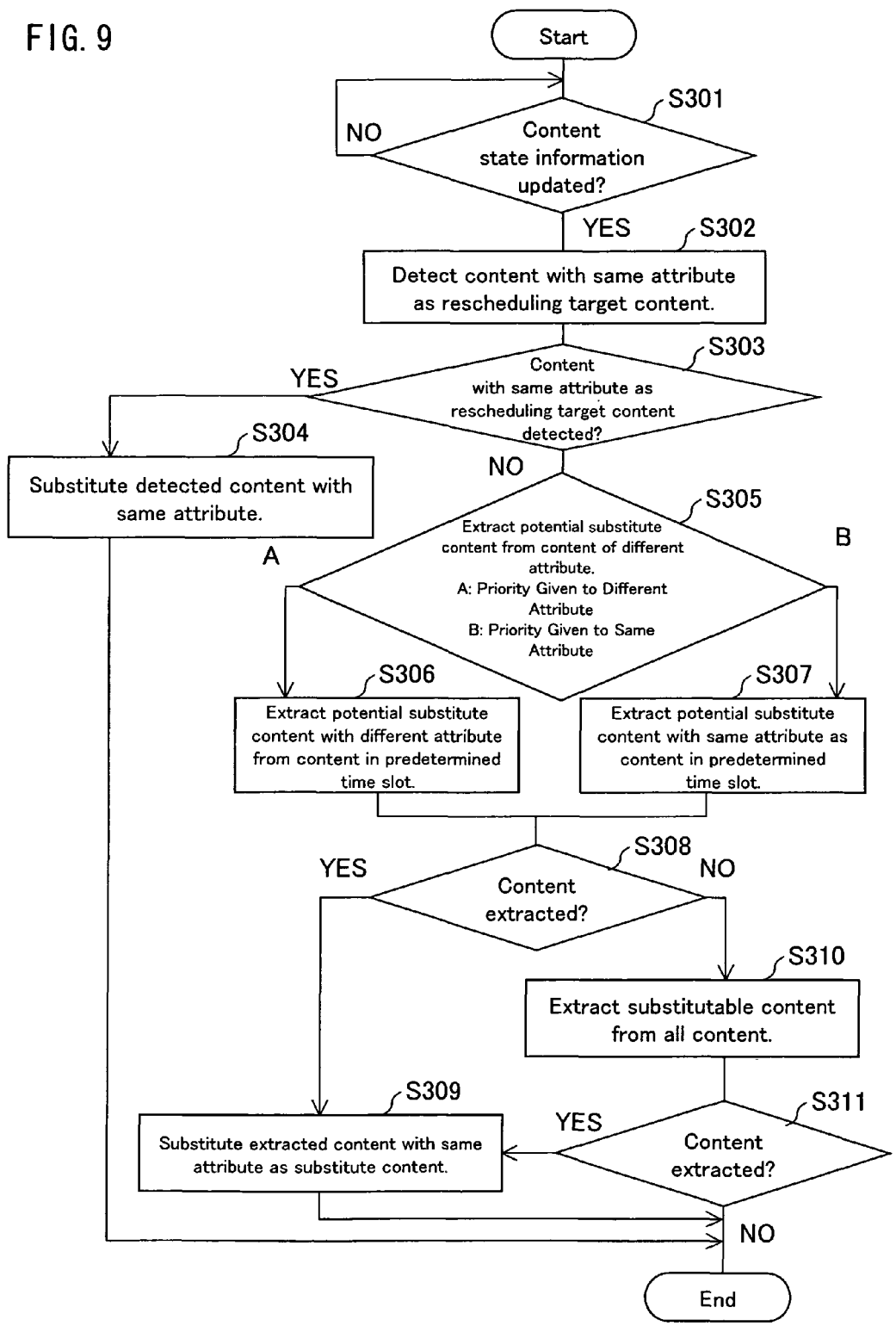
FIG. 9 is a flow chart illustrating a reproduction schedule rearranging process performed in accordance with an update of the content state information in a digital television of the present embodiment.

Referring to FIG. 9, the following will describe a reproduction schedule rearranging process after "CM1" reproduced starting at 19:00 was viewed, and content state information was updated in accordance with the update rule 151 shown in FIG. 5. The reproduction schedule until "CM1" is viewed is shown in FIG. 8. Suppose that as shown in FIG. 3, the content state information of "content CM3" at that time is "reproduction permitted." That is, the reproduction schedule in FIG. 8 is produced before 19:00 when "CM1" is reproduced. Since the content state information of "content CM1" and "content CM3" at that time is "reproduction permitted," "content CM3" is scheduled in the reproduction schedule in FIG. 8 so that it is reproduced starting at 19:30.

(Reproduction Schedule Rearranging Process)

When the state information update section 23 (FIG. 1) has updated the content state information of content "CM3" to 'erase data,' the update sensing section 31 recognizes "CM3" as rescheduling target content and starts a reproduction schedule rearranging process because "CM3" is already included in the reproduction schedule produced (FIG. 8) (YES in S301).

The update sensing section 31 determines to rearrange a reproduction schedule when, as another example, the content state information of the content included in the reproduction schedule is updated to 'reproduction forbidden.' That is, the update sensing section 31 senses the content which can no longer be reproduced as rescheduling target content and determines to rearrange the reproduction schedule.

The substitute content detecting section 32 (or content detecting section 22) detects content which has the same attribute as "CM3" as the rescheduling target content (S302). In other words, the section 32 detects content "CM1," "CM2," and "CM4" which have the "CO1" attribute (FIG. 3). The section 32 preferably does not detect if the content state information of "CM1" is 'reproduction forbidden' or 'erase data.'

The substitute content detecting section 32 then determines whether content with the same attribute which can be substituted has been obtained (S303). If there is content which can be substituted (YES in S303), the content is substituted as the substitute content for "CM3" (S304), thereby ending the process.

When there are two or more pieces of substitute content as in the above example, if the schedule is not full, the reproduction schedule may be arranged to contain all those pieces instead of the rescheduling target content. If the schedule is not so much full as to accommodate all the pieces, the schedule may be arranged so as to selectively contain substitute content. There are no particular limitations on the criteria in selecting substitute content. It would be sufficient if priority in scheduling is determined by the content ID, content name (either in ascending or descending order), user preferences, etc.

In contrast, if there is no content with the same attribute which can be substituted (NO in S303), the potential substitute extracting section 33 extracts substitute content from content of a different attribute contained in the content storage 51 (S305). In the present embodiment, the potential substitute extracting section 33 extracts substitute content in accordance with the two criteria explained below.

(A: Priority Given to Different Attribute)

The potential substitute extracting section 33 extracts substitute content from the content contained in the content storage 51 which is not included in the reproduction schedule. In the extraction, the section 33 extracts content which has a different attribute from the content filling predetermined time slots in the reproduction schedule (S306).

If the substitute content extracted using the aforementioned query is included replacing "CM3," the schedule is arranged to include content with varied attributes in the same time slot, providing the user with a large variety of content.

The predetermined time slot refers to a time slot before/after the time slot (19:30 to 19:40) in which the rescheduling target content ("CM3") was scheduled. For example, if one hour both before and after the time slot for "CM3" is designated as the predetermined time slot, the predetermined time slot is "18:30 to 20:40." Two hours or 24 hours before and after the time slot may be designated. The duration of the slot is not limited. In setting up the predetermined time slot, all the dates when the rescheduling target content was scheduled may be covered.

(B: Priority Given to Same Attribute)

The potential substitute extracting section 33 extracts substitute content from the content not found in the reproduction schedule. In the extraction, the section 33 extracts content which has the same attribute as any piece of the content scheduled for the predetermined time slots in the reproduction schedule (S307).

If the substitute content extracted using the aforementioned query is included replacing "CM3," content with the same attribute can be provided together to the user in the same time slot.

Next, if the potential substitute extracting section 33 extracts substitute content in S306 and/or S307 (YES in S308), the content scheduling section 34 schedules the extracted substitute content between 19:30 to 19:40 when "CM3" was originally scheduled (S309). Examples include "content F-1 (different attribute from that of content in a time slot)" and "content N-2 (same attribute as that of content in a time period)."

The content scheduling section 34 may identify a vacant time slot in the reproduction schedule to schedule multiple pieces of substitute content. For example, Five 50-minute pieces of rescheduling target content may be replaced with a 10-minute piece of substitute content.

In contrast, if the section 33 extracts substitute content which matches the query neither in S306 nor in S307, the section 33 may extract content which is permitted to reproduce and/or content which is yet to be included in the reproduction schedule under no conditions from all the content contained in the content storage 51 (S310). By detecting substitute content under lax conditions in this manner, it becomes possible to provide as many pieces of content as possible to the user. Also, S306 and S307 may be skipped before proceeding to S310.

If substitute content is extracted which can be substituted for the rescheduling target content (YES in S311), the content is substituted (S309), thereby ending the process. If no replaceable content is obtained (NO in S311), the process is ended without replacing the content.

By the method, if "CM3" is erased, "CM2," having the same attribute as "CM3," can be used to rearrange the reproduction schedule and fill up the position previously occupied by "CM3." That is, the method enables the execution of control of "erasing 'CM3' and permitting reproduction of 'CM2'" accompanying the viewing of "CM1" without complex user manipulation.

Hence, in accordance with the process execution state of content corresponding to user manipulation, the content state information of relevant content can be controlled, and the user is provided with preferred content in a preferred order and at a preferred timing. Further, even if the reproduction of content included in the reproduction schedule becomes impossible since the content state information of the content is updated, the reproduction schedule can be rearranged by scheduling relevant content having the same attribute as the rescheduling target content. Therefore, it is possible to produce a reproduction schedule which provides the user with the most favorite content.

Further, even if no content is detected which has the same attribute as the rescheduling target content, the reproduction schedule can be updated by rescheduling content which resides in the predetermined time slot and has a different attribute from the rescheduling target content. As a result, it becomes possible to control the digital television 1 so that content with varied attributes can be reproduced.

Alternatively, even if no content is detected which has the same attribute as the rescheduling target content, the reproduction schedule can be updated by rescheduling content which resides in the predetermined time slot and has the same attribute as the rescheduling target content. As a result, it becomes possible to control the digital television 1 so that relevant content can be reproduced together.

Further, the reproduction control section 40 (FIG. 7) can retrieve the reproduction schedule rearranged as above from the reproduction schedule storage 54 and reproduce the content contained in the content storage 51 in accordance with that schedule. Hence, in accordance with the process execution state of content corresponding to user manipulation, the user is provided with the most favorite content.

(Potential Substitute Extracting Method)

Referring to the content table in FIG. 3 and the reproduction schedule in FIG. 8, the following will describe more specifically how the potential substitute extracting section 33 extracts content by giving priority to different attributes in S306 (FIG. 9).

Suppose that "content D-1 (=rescheduling target content)" on recorded content channel 1 from 19:40 to 19:50 has been erased. Accordingly, "content D-1" on channel 2 from 20:00 to 20:10 is also erased.

There is no content with the "D01" attribute; the potential substitute extracting section 33 extracts content with a different attribute from that of the content scheduled for a predetermined time slot.

Specifically, the predetermined time slot is set to 40 minutes before and after. That is, since "content D-1" is scheduled from 19:40 to 19:50 and from 20:00 to 20:10, and the searched time slot is 40 minutes before and after those periods, the predetermined time slot is from 19:00 to 20:50. The attributes of the content in this time period will be included in the search query. Hence, when there are multiple pieces of rescheduling target content, it is possible to specify a time slot and extract matched substitute content.

Therefore, since there are nine pieces of content, "content K-1," "content CM3," "content E-1," "content L-1," "content F-1," "content CM1," "content M-1," "content C-6," and "content N-1," scheduled in the time slot, the content storage 51 is searched for reproducible content which has a different attribute from those of the nine pieces of content. As a result, four pieces of content, "content C-6," "content G-1," "content I-1," and "content J-1," are extracted.

The content scheduling section 34 updates the reproduction schedule by scheduling any piece of the above content to fill up the position previously occupied by "content D-1." There are by no means any limitations at all on how to select one of the four pieces of content and one of the two channels in which "content D-1" will be replaced. For example, these selections may be made at random: e.g. "content G-1" may be selected to fill in the 20:00 to 20:10 slot on recorded content channel 2.

The following is a case where the process in the aforementioned example branches to S307 in which the potential substitute extracting section 33 extracts content with priority given to different attributes.

The potential substitute extracting section 33 extracts content with the same attribute as that of the content scheduled in a predetermined time slot.

Specifically, the predetermined time slot is set to 60 minutes before. That is, since "content D-1" is scheduled from 19:40 to 19:50 and from 20:00 to 20:10, and the searched time slot is 60 hours before those periods, the predetermined time slot is from 18:40 to 20:00. The attributes of the content in this time period will be included in the search query. Hence, when there are multiple pieces of rescheduling target content, it is possible to specify a time slot and extract matched substitute content.

Therefore, since there are five pieces of content, "content K-1," "content CM3," "content E-1," "content CM1," and "content M-1," scheduled in the time slot, the content storage 51 is searched for reproducible content which has the same attribute as five pieces of content. As a result, "content M-2" is extracted.

The content scheduling section 34 rearranges the reproduction schedule by rescheduling "content M-2" to fill up the position previously occupied by "content D-1."

One piece of "content M-2" may be scheduled to fill either only the 19:40 to 19:50 position on recorded content channel 1 or only the 20:00 to 20:10 position on channel 2, or both.

The same content may be schedules to fill in the two "content D-1" positions. Different content may be schedules to fill in those positions.

In the above description, the substitute content is computed simultaneously for the two "content D-1" positions. The substitute content may be computed at different times for the two positions. That is, to extract potential substitute content for "content D-1" from 19:40 to 19:50, a search may be done with the searched time slot being set to one hour before that, i.e., 18:40 to 19:40. Meanwhile, to extract potential substitute content for "content D-1" from 20:00 to 20:10, a search may be done with the searched time slot being set to one hour before that, i.e., 19:00 to 20:00.

(Computer System Configuration to Realize Content Processing Device)

Figure 10:
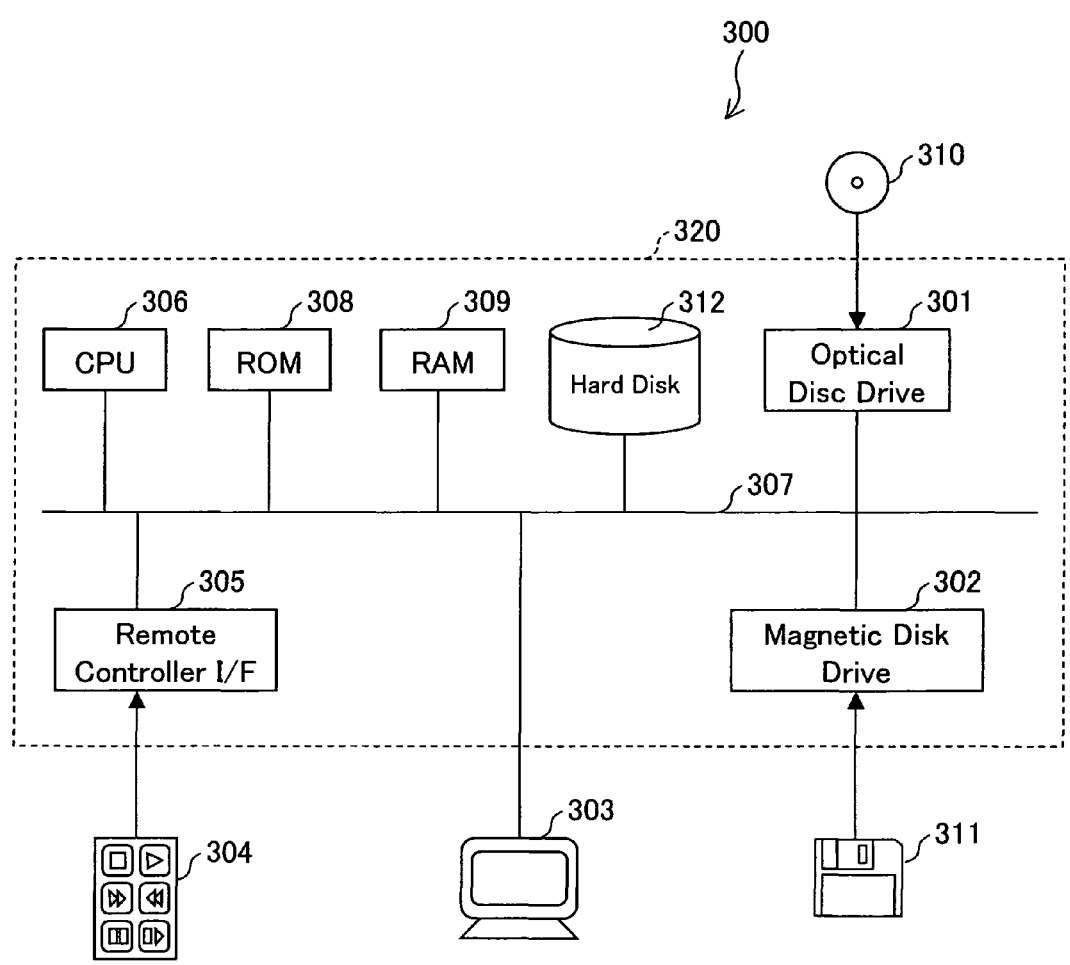
FIG. 10 is a schematic block diagram illustrating the configuration of a computer system which realizes a digital television of the present embodiment.

A content processing device (digital television 1) in accordance with the present invention is realized substantially by computer hardware, computer programs executed by the computer hardware, and data contained in the computer hardware. FIG. 10 illustrates the internal configuration of such a computer system 300.

Referring to FIG. 10, the computer system 300 includes a computer 320, a monitor 303, and a remote controller 304. The computer 320 includes an optical disc drive 301 and a magnetic disk drive 302.

The computer 320 includes, in addition to the optical disc drive 301 and the magnetic disk drive 302, a remote controller interface (I/F) 305, a CPU (center processing device) 306, a bus 307, a read-only memory (ROM) 308, and a random access memory (RAM) 309. The remote controller interface (I/F) 305 receives a signal from the remote controller 304. The bus 307 is connected to the remote controller interface 305, the CPU 306, the optical disc drive 301, and the magnetic disk drive 302. The read-only memory (ROM) 308 is connected to the bus 307 and contains the boot program. The random access memory (RAM) 309 is also connected to the bus 307 and contains program instructions, system programs, work data, etc.

Although not shown, the computer 320 may further include a network adapter board providing connection to a local area network (LAN).

Both the content data and the computer programs which realize the functions of the content processing device on the computer system 300 are contained on an optical disc 310 or magnetic disk 311 inserted in the optical disc drive 301 or magnetic disk drive 302 and transferred to a hard disk 312. Alternatively, the content and programs may be transmitted to the computer 320 over a network (not shown) for storage in the hard disk 312. The programs are loaded into the random access memory 309 upon execution. The programs may be loaded directly into the random access memory 309 from the optical disc 310, from the magnetic disk 311, or over a network.

The programs includes a plurality of instructions realizing the functions of the content processing device in accordance with the present invention on the computer 320. Some of the basic functions needed to realize these functions are provided as part of a module which includes the operating system (OS) or third party programs running on the computer 320 or various toolkits installed on the computer 320. Therefore, the programs do not necessarily include all functions needed to realize the functions of the content processing device in accordance with the present invention. The programs need to include only those instructions which execute the control of the content processing device by recalling suitable functions or "tools" in such a controlled manner that desired results are achieved. The operation of the computer system 300 is well known and not explained here.

The storage medium containing the content data and the computer programs realizing the functions of the content processing device is by no means limited to the optical disc 310 which may be a CD-ROM (compact disc read only memory), MO (magneto-optical disc), MD (MiniDisc), or DVD (digital versatile disc) or the magnetic disk 311 which may be a FD (flexible disk) or hard disk. Examples of such a storage medium include tapes, such as magnetic tapes and cassette tapes; card storage media, such as IC (integrated circuit) cards and optical cards; and semiconductor memories, such as masked ROMs, EPROMs (Erasable Programmable ROMs), EEPROMs (Electrically Erasable Programmable ROMs), and flash ROMs. Nevertheless, the computer system 300 needs to have a readout device for retrieval from these storage media.

Further, the aforementioned embodiment described the content processing device in accordance with the present invention as the digital television 1 including: the content management section 20 for managing content by updating content state information; the reproduction schedule management section 30 for rearranging a reproduction schedule in accordance with the content state information updated by the content management section 20; and the reproduction control section 40 for reproducing the content in accordance with the reproduction schedule rearranged by the reproduction schedule management section 30. The content processing device in accordance with the present invention is however by no means limited to this configuration.

For example, the content management section 20, the reproduction schedule management section 30, and the reproduction control section 40 may be provided in separate devices.

Figure 11:
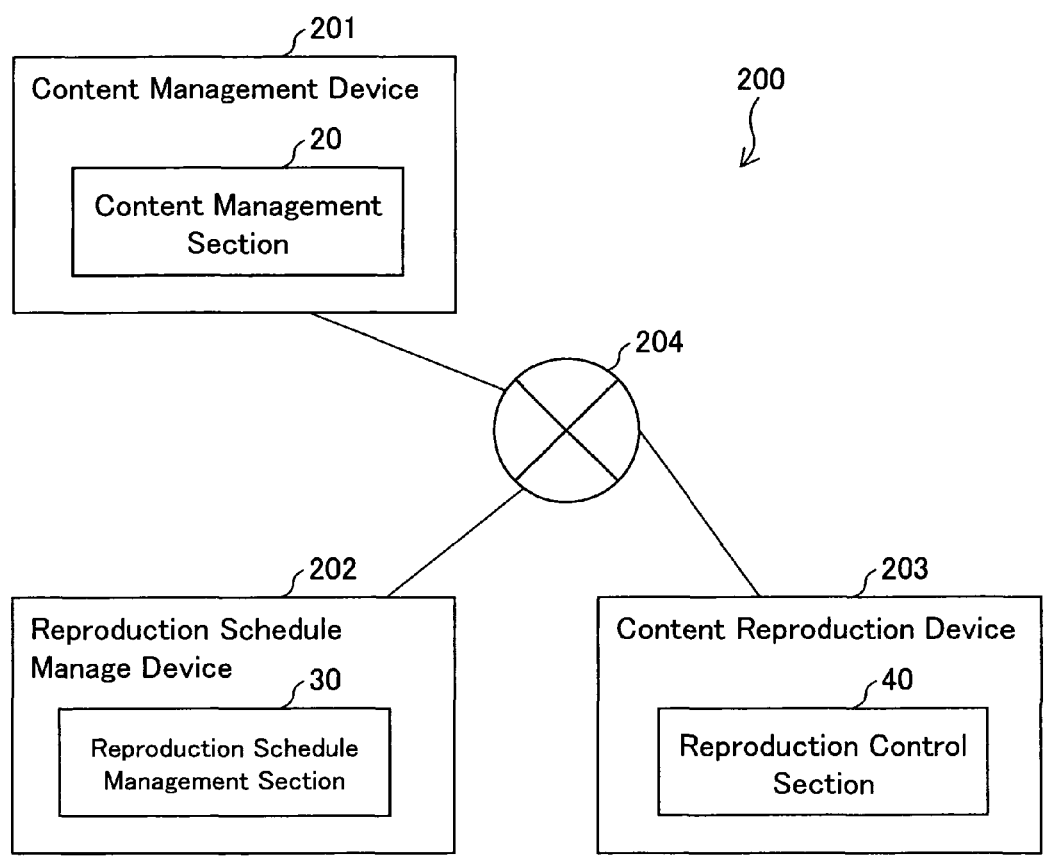
FIG. 11 is a schematic block diagram illustrating the configuration of a content processing system in accordance with the present invention.

As shown in FIG. 11, the content management device 201 including the content management section 20, the reproduction schedule manage device 202 including the reproduction schedule management section 30, the content reproduction device 203 including the reproduction control section 40 may be provided. When these devices are connected over a network 204 so that the devices are communicable with each other, the devices constitute a content processing system 200 which achieves substantially the same effects as the content processing device in accordance with the present invention (digital television 1).

In a case like this, the content storage 51 and the content state information storage 52 are provided so as to allow all the devices in the content processing system 200 to retrieve and the content management device 201 to rewrite. The update procedure storage 53 is provided so as to allow the content management device 201 to retrieve. The reproduction schedule storage 54 is provided so as to allow the reproduction schedule manage device 202 to retrieve and rewrite and the content reproduction device 203 to retrieve.

The digital television 1 described in the embodiments is a mere example and is by no means limiting the content processing device in accordance with the present invention. For example, the content processing device in accordance with the present invention is applicable to any kind of information processing device, including personal computers, mobile phones, PDAs (personal digital assistances), and radios.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims.

Finally, the blocks in the digital television 1, especially, the state sensing section 21 and the state information update section 23, may be implemented by hardware logic or software executed by a CPU as below:

The digital television 1 includes a CPU (central processing unit) executing instructions in a control program realizing the functions and storage devices (storage media), such as a ROM (read only memory), containing the program, a RAM (random access memory) loading the program, and a memory containing the program and various data. The objective of the present invention can also be achieved by mounting to the digital television 1 a computer-readable storage medium containing the code (executable program, intermediate code program, or source program) of a control program for the digital television 1 which is software realizing the aforementioned functions, in order for the computer (or CPU, MPU) to retrieve and execute the program code contained in the storage medium.

The storage medium may be, for example, a tape, such as a magnetic tape and a cassette tape; a magnetic disk, such as a Floppy® disk or a hard disk, or an optical disc, such as a CD-ROM/MO/MD/DVD/CD-R; a card, such as an IC card (memory card) or an optical card; or a semiconductor memory. such as a masked ROM/EPROM/EEPROM/flash ROM.

The digital television 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired lines, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network. The present invention encompasses a carrier wave or a data signal transmission in which the program code is embedded electronically.

(Supplement)

An information processing device (digital television 1) of the present invention includes the above-describe content management section 20 of the digital television 1. The device further includes content storage means (content storage 51) for storing content; reproduction schedule producing means (reproduction schedule management section 30) for producing a reproduction schedule of content stored in the content storage means; and reproduction schedule update means (content scheduling section 34) for updating the reproduction schedule on the basis of the content state information of at least one of the first piece of content updated by the update means and the second piece of content.

In the information processing device, preferably, if content in the reproduction schedule cannot be reproduced due to the update of content state information by the update means, the reproduction schedule update means detects, in the content stored in the content storage means, content with the same attribute as the content which has become impossible to reproduce and with "reproducible" content state information, and allocates the detected content to the position previously occupied by the content now impossible to reproduce.

In the information processing device, preferably, if content in the reproduction schedule cannot be reproduced due to the update of content state information by the update means, the reproduction schedule update means detects, in the content stored in the content storage means, content with a different attribute from that of the content which has become impossible to reproduce and with a different attribute from that of the content allocated to a time period in the reproduction schedule, and allocate the detected content to the position previously occupied by the content now impossible to reproduce.

In the information processing device, preferably, if content in the reproduction schedule cannot be reproduced due to the update of content state information by the update means, the reproduction schedule update means detects, in the content stored in the content storage means, content with a different attribute from that of the content which has become impossible to reproduce and with the same attribute as the content allocated to a time period in the reproduction schedule, and allocates the detected content to the position previously occupied by the content now impossible to reproduce.

In the information processing device, preferably, the time period refers to any given period before and/or after the position previously occupied by the content now impossible to reproduce.

A content reproduction device (digital television 1) of the present invention includes the above-described information processing device (reproduction schedule management section 30). The content reproduction device further includes content reproduction means (reproduction control section 40) for reproducing content in accordance with the reproduction schedule.

In the content reproduction device, preferably, operation detecting means (state sensing section 21) detects reproduction of content by the content reproduction means and regards the content as the first piece of content.

Accordingly, the reproduced content is regarded as the first piece of content; therefore, the content state information of the reproduced content and content relevant to the reproduced content can be updated. Further, the reproduction schedule update means also can suitably update the reproduction schedule in accordance with the updated content state information.

In the content reproduction device, preferably, the content reproduced by the content reproduction means is regarded as the first piece of content, and the content reproduction device includes action monitoring means (camera/manipulation means) for monitoring acts of a user in relation to the first piece of content. The operation detecting means detects user operations on the first piece of content in the acts of the user monitored by the action monitoring means.

According to the configuration, the content reproduced by the content reproduction means is regarded as the first piece of content, and the action monitoring means monitors the acts of the user on the reproduced content.

Accordingly, the content state information of the content manipulated by the user and the content relevant to that content is updated in accordance with the user's acts monitored by the action monitoring means. In other words, the content and the content relevant to that content are controlled more elaborately in accordance with user manipulation.

The content processing device in accordance with the present invention is capable of updating the content state information related to the content reproduction control in accordance with the process execution state of the content corresponding to user manipulation. Therefore, the device is suited to application to various information processing devices which record and manage content for reproduction.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A content processing device in accordance with the present invention, to solve the problems, is characterized in that it is a content processing device for managing content stored for reproduction and includes: a state sensing section for sensing a process execution state of a first piece of content in a process executed in accordance with user manipulation; and a state information update section for updating, in accordance with the process execution state sensed by the state sensing section, content state information based on which processing of at least one of the first piece of content and a second piece of content relevant to the first piece of content is controlled.

According to the configuration, when the user manipulates the content processing device, the content processing device executes content processing in accordance with the manipulation. The target content for this processing will be referred to as content A. The state sensing section senses a state (process execution state) of content A in a process executed by the content processing device.

The process execution state of content is, for example, a state where reproduction of content A has been started in accordance with a reproduction command from the user; a state where the reproduction of reproduced content A has been ended; a state where an access to an information source contained in content A is started; or a state where a command has been received to erase content data. However, the state is not limited by these examples. Various states of the process executed on content by the content processing device in accordance with user manipulation are possible.

As the method to access other information in content, the URL (uniform resource locator) for accessing other information in the content is described. Clicking it may allow access to other information. Buttons may be prepared. Pressing the buttons may allow access to the other information or starts other content. For example, when the content is a mail-order TV/radio program, the content includes a URL pointing the user to a site where a purchase is made. An access to the URL or a purchase of commercial goods after the access to the URL are also included in user operation.

As the state sensing section senses a predetermined process execution state of content A, the state information update section updates the content state information of at least one of content A and other content (related content) relevant to content A, based on a predetermined information update procedure. An example of the predetermined information update procedure would be to update the content state information of the first piece of content to state information, 'erase data,' from a process execution state indicating that the first piece of content has been reproduced (viewed) and update the content state information of the second piece of content to state information, 'reproduction permitted.'

The content state information is information indicating the state of content for the control of content reproduction. For example, the content state information may be a binary information indicative of whether to permit or forbid reproduction of the content, information indicative of whether to erase content stored in a storage for reproduction from the storage, or information indicative of whether to execute the content.

Accordingly, if the user wants to alter settings for content reproduction control, the user can update the content state information on content reproduction control without directly sending a setting altering command and without a manipulation to specify the content for which settings are to be altered. Therefore, the user is not required to perform separate complex manipulation, but still able to update the content state information of content at a suitable timing and in a suitable manner to the substance when the user enters a command to process the content.

The following will describe by way of more specific examples. For example, suppose that content A is a learning material giving problems and that content B is content which gives solutions and explanations to the problem given by content A (that is, content B is related content of content A). Suppose also that the user has manipulated to reproduce content A.

In a case like this, as the state sensing means senses a state where the reproduction of content A is completed, the information update means updates the content state information of content B relevant to the content A from 'reproduction forbidden' to 'reproduction permitted' in accordance with a predetermined information update procedure (for example, "update the content state information of content B from 'reproduction forbidden' to 'reproduction permitted' after the reproduction of content A").

By this process, the reproduction of content A and content B is controllable so that the content B is reproducible only after the content A is reproduced.

Conventionally, to update the content state information in relation to process control for such content, the user needed to manually: (1) input commands to start updating of the content state information; (2) specify the content which is to be updated; and (3) commands as to how the content state information of the content should be updated. These operations are no longer required. For example, the user can execute a suitable update process for content state information on the content processing device with only a "reproduce content A" operation. In addition, the content state information in relation to reproduction control of other, relevant content can be fine tuned in accordance with user manipulation.

It is preferable if the content processing device includes, in addition to the above features, content detecting means for detecting the second piece of content relevant to the first piece of content in a content storage storing content, wherein the content detecting means detects, as the second piece of content, content having attribute information which matches attribute information of the first piece of content, the attribute information indicating an attribute of a piece of content contained for each piece of content in the content storage.

According to the configuration, each piece of content is assigned with attribute information indicating an attribute of the content. The content detecting means detects as the second piece of content (for example, content B) which has the same attribute as the first piece of content (for example, content A) on which a certain process has been executed.

The information update means updates the content state information of content detected by the content detecting means in accordance with the process execution state of content A.

The attribute information is, for example, a group identifier to categorize content into groups on the basis of the substance, nature, and properties of the content. Attributes may be assigned in any manner. For example, the content provided from the same company may be assigned with the same attribute. In addition, for content like dramas, the first episode through the last episodes may be assigned with the same attribute. For content like mail-order TV/radio programs, the content which advertises the same commercial goods may be assigned with the same attribute.

Accordingly, relevant content is assigned with the same attribute. Therefore, by detecting content having the same attribute as the first piece of content, the content detecting means can detect relevant second pieces of content.

From the description above, the other related content of which the content state information needs be updated in accordance with the process executed on the first piece of content can also be updated automatically without the user specifying the content to be updated.

The attribute information may be predetermined and provided for each piece of content by the content provider who delivers the content.

According to the configuration, the content detecting means can detect the second piece of content relevant to the first piece of content based on the attribute determined by the content provider.

The content provider, when providing content to users, assigns an attribute so as to be most effective to the content provider and delivers the content to users. For example, in a case like advertisement content, the same attribute may be assigned to advertisement content provided by affiliate companies, to increase interrelated advertisement effect.

Accordingly, the content state information of each piece of content can be updated so that the content is reproduced for viewing in a manner the content provider likes.

Alternatively, the attribute information may be set up in advance for each piece of content by the user.

According to the configuration, the content detecting means can detect the second piece of content relevant to the first piece of content based on the attribute set up by the user.

The user may set up in advance by, for example, directly rewriting the attribute assigned by the content provider. Alternatively, instead of directly rewriting the attribute. the attribute may be set up virtually by filtering.

Accordingly, the user can categorize each piece of content into groups of relevant pieces of content as they like. For example, by either directly or virtually assigning the same attribute to all content the user like, the user can enjoy improved convenience. That is, the content state information of each piece of content can be updated so that the content is reproduced as the user likes to view them.

Furthermore, the content processing device includes, in addition to the above features, content manipulation means for manipulating the content in accordance with the content state information updated by the information update means.

To describe it in more detail, there may be included content reproduction means for controlling, on the basis of the content state information, reproduction of content associated with the content state information, the content state information having been updated by the information update means and indicating whether to permit the reproduction of the content.

According to the configuration, the content reproduction means controls reproduction of content on the basis of the updated content state information.

Specific examples may include unlocking the content for reproduction of which the content state information has been updated to 'reproduction permitted,' reproduction of content of which the content state information has been updated to 'proceed to reproduce,' and locking content of which the content state information has been updated to 'reproduction forbidden.'

Accordingly, it becomes possible to control content reproduction by disabling reproduction of content which is desirably not to be reproduced and enabling reproduction of content which is desirably to be reproduced.

Alternatively, there may be included content erase means for erasing, on the basis of the content state information, content associated with the content state information from the content storage, the content state information having been updated by the information update means and indicating an instruction to erase the content.

According to the configuration, the content erase means performs a process to erase content on the basis of the updated content state information.

Specific examples may include erasing from the content storage the content of which the content state information has been updated to 'erase data.'

Accordingly, for example, by erasing content which has been viewed n times and therefore is no longer needed to be stored, the portion of the storage occupied by the content is freed.

Further, it is preferable if the content processing device includes, in addition to the above features, reproduction schedule generating means for generating, on the basis of the content state information updated by the information update means, a reproduction schedule specifying particular pieces of content and reproduction times thereof.

According to the configuration, the reproduction schedule generating means rearranges the reproduction schedule on the basis of the updated content state information.

The reproduction schedule is a schedule table specifying particular pieces of stored content and reproduction times thereof, targeting the content stored in the content storage. The reproduction schedule may be produced covering only the stored content or covering both the stored content and electronic program schedules. The content reproduction process can be controlled in accordance with such a reproduction schedule.

For example, if the content specified the reproduction schedule cannot be reproduced due to an update of the content state information, the content can be removed from the reproduction schedule to rearrange the reproduction schedule with only reproducible content. As a result, content reproduction control is possible with the reproduction schedule being always kept in an optimal state.

Further, the reproduction schedule generating means may include: update sensing means for sensing, as reproduction-forbidden content, content which is specified in the reproduction schedule and which is not permitted to reproduce due to an update of the content state information; and substitute content detecting means for detecting, as substitute content, content which is permitted to reproduce and which has the same attribute as the reproduction-forbidden content, and the reproduction schedule generating means may generate a reproduction schedule which specifies the substitute content detected by the substitute content detecting means in place of the reproduction-forbidden content.

According to the configuration, the update sensing means senses the content which is no longer reproducible due to an update of the content state information (reproduction-forbidden content) in the content specified in the reproduction schedule.

Subsequently, the substitute content detecting means detects the reproducible substitute content which has the same attribute as the reproduction-forbidden content.

Accordingly, the reproduction schedule generating means rearranges the reproduction schedule by scheduling the substitute content to the position where irreproducible, reproduction-forbidden content is scheduled.

Accordingly, reproducible content which is relevant to the content now irreproducible can be included in the schedule.

For example, advertisement content for commercial goods A is included in a plurality of places in the reproduction schedule. The user buys commercial goods A at a certain time, and the content state information of the advertisement content for commercial goods A is updated to 'reproduction forbidden.' In a case like this, the advertisement content for accessories A1 for commercial goods A which has the same attribute as the advertisement content for commercial goods A may be scheduled instead. As a result, the user is not offended by another reproduction of the content which advertises commercial goods A even though the user has already purchased commercial goods A. Instead, the content which advertises accessories A1 is reproduced for the viewer, which adds convenience to the user. Meanwhile, the vendors of the commercial goods can enjoy better advertisement effect because users who have already purchased commercial goods A can view the content which advertises accessories A1.

Further, in addition to the above features, the reproduction schedule generating means may further include potential substitute detecting means for detecting, as the substitute content, content which is permitted to reproduce and which has a different attribute from an attribute of the content specified in the reproduction schedule; and the reproduction schedule generating means may generate a reproduction schedule which specifies the substitute content detected by the potential substitute detecting means in place of the reproduction-forbidden content.

According to the configuration, the reproduction-forbidden content is included in the reproduction schedule. Therefore, when the reproduction schedule generating means is to reschedule reproduction, the potential substitute detecting means detects, as a substitute content, the content which has a different attribute from that of any piece of content included in the reproduction schedule. The detected substitute content is substituted for the reproduction-forbidden content in the reproduction schedule.

Accordingly, even if no content is detected which has the same attribute as the reproduction-forbidden content as the appropriate substitute content, content which has a different attribute from the content in the reproduction schedule is scheduled instead. Therefore, it becomes possible to control content reproduction for content of various attributes.

Alternatively, in addition to the above features, the reproduction schedule generating means may further include potential substitute detecting means for detecting, as the substitute content, content which is permitted to reproduce and which has the same attribute as an attribute of the content specified in the reproduction schedule; and the potential substitute detecting means may generate a reproduction schedule which specifies the substitute content detected by the potential substitute detecting means in place of the reproduction-forbidden content.

According to the configuration, the reproduction-forbidden content is scheduled in the reproduction schedule. Therefore, when the reproduction schedule generating means reschedule reproduction, the potential substitute detecting means detects, as the substitute content, content which has the same attribute as one of the attributes of the content included in the reproduction schedule. The detected substitute content is substituted for the reproduction-forbidden content in the reproduction schedule.

Accordingly, even if no content is detected which has the same attribute as the reproduction-forbidden content as the appropriate substitute content, content which has the same attribute as the content in the reproduction schedule is scheduled instead. Therefore, it becomes possible to control content reproduction so that relevant content with the same attribute as the content in the reproduction schedule is reproduced instead.

Further, the potential substitute detecting means may detect, as the substitute content, content which has a different and/or the same attribute as an attribute of content scheduled for a predetermined time slot specified in the reproduction schedule.

Accordingly, content which has the same or a different attribute as an attribute of content scheduled for a predetermined time slot specified in the reproduction schedule can be scheduled in place of the reproduction-forbidden content. Therefore, when content with a different attribute is detected, content reproduction can be controlled so that content with various attributes is reproduced in the predetermined time slot. When content with the same attribute is detected, content reproduction can be controlled so that content with the same attribute is reproduced together in the predetermined time slot.

Further, the predetermined time slot can be set on the basis of time before and/or after the reproduction-forbidden content was originally scheduled. Examples include one hour before and after the time slot in which the reproduction-forbidden content was scheduled, two hours before the scheduled reproduction starting time for the reproduction-forbidden content, 24 hours after the scheduled reproduction ending time, and any other time period.

The process execution state of the first piece of content sensed by the state sensing means is a state where reproduction of the first piece of content in accordance with a content reproduction command from a user has been ended. The information update means may update, to content state information indicating "reproduction permitted," the content state information of the second piece of content which is predetermined to be reproduced when the reproduction of the first piece of content is ended.

Accordingly, content reproduction control can be done so that the second piece of content is reproduced after the first piece of content is reproduced.

Further, the state sensing means may monitor whether the user has viewed the reproduced content, using a camera or other image capture means. Accordingly, the image capture means can monitor to determine whether the user has viewed the content. The content state information can be thereby updated of the content viewed by the user and content relevant to that content. As a result, cases where the user has reproduced and viewed the content can be distinguished from cases where the user has reproduced, but not viewed the content. The content state information can thereby updated in accordance with each case.

Alternatively, the process execution state of the first piece of content sensed by the state sensing means is a state where a command for an access to the address presented by the first piece of content has been received from the user. The information update means may update, to content state information indicating "reproduction permitted," the content state information of the second piece of content which is predetermined to be reproduced after the access to the address is executed.

The state sensing means senses a process execution state where the information in the first piece of content (for example, a URL) has been accessed.

Accordingly, content reproduction control can be done so that the second piece of content is reproduced by executing a process to access the information presented in the content. As a result, cases where the user has reproduced and viewed the content can be distinguished from cases where the user has reproduced the content and accessed the information contained therein. The content state information can thereby updated in accordance with each case. Further, by monitoring as to what the user has done after accessing the information in the content, the control can be fine tuned.

Alternatively, the process execution state of the first piece of content sensed by the state sensing means is a state where a command for an execution of a purchase process for commercial goods advertised in the first piece of content has been received from the user. The information update means may update, to content state information indicating "reproduction permitted," the content state information of the second piece of content which is predetermined to be reproduced after the purchase process is executed.

The state sensing means senses a process execution state of a purchase process for the user to purchase commercial goods advertised in the first piece of content.

Accordingly, content reproduction control can be done so that the second piece of content is reproduced by purchasing the commercial goods advertised in the content.

A content processing method in accordance with the present invention, to solve the problems, is characterized in that it is a content processing method executed by a content processing device for managing content stored for reproduction and includes the steps of: (a) sensing a process execution state of a first piece of content in a process executed in accordance with user manipulation; and (b) updating, in accordance with the process execution state sensed in step (a), content state information based on which processing of at least one of the first piece of content and a second piece of content relevant to the first piece of content is controlled.

According to the method, an updating process for content state information of a suitable substance is automatically executed at a suitable timing in accordance with the execution state of processing executed on content in response to the user manipulation.

Therefore, the user can implement, with for example a "reproduce content A" operation, a content processing method in which the content processing device executes a suitable update process on the content state information. Conventionally, to update content state information in relation to such content process control, the user needed to manually: (1) input commands to start updating of content state information; (2) specify the content which is to be updated; and (3) commands as to how the content state information of the content should be updated. In addition, the content state information in relation to reproduction control of other, relevant content can be fine tuned in accordance with user manipulation.

The content processing device may be realized by a computer. In a case like this, a control program for a content processing device which realizes the content processing device on a computer by causing the computer to function as each of the means, and a computer-readable storage medium containing the program also fall into the scope of the present invention.

What is claimed is:

1. A content processing device for managing content stored for reproduction, the device comprising:
   a state sensing section for sensing a process execution state of a first piece of content in a process executed in accordance with user manipulation;
   an information update section for updating, in accordance with the process execution state sensed by the state sensing section, content state information based on which processing of at least one of the first piece of content and a second piece of content relevant to the first piece of content is controlled;
   a detecting section for detecting the second piece of content relevant to the first piece of content in a content storage storing content; and
   a content erase section for erasing data of the content from the content storage, wherein
   the detecting section detects, as the second piece of content, content having attribute information which matches attribute information of the first piece of content, the attribute information indicating an attribute of a piece of content contained for each piece of content in the content storage, and
   the content erase section erases, on the basis of the content state information, content associated with the content state information from the content storage, the content state information having been updated by the information update section and indicating an instruction to erase the content.

2. The content processing device of claim 1, wherein
   the attribute information is predetermined and provided for each piece of content by a content provider who delivers content.

3. The content processing device of claim 1, wherein the attribute information is set up in advance for each piece of content by a user.

4. The content processing device of claim 1, further comprising content reproduction section for controlling, on the basis of the content state information, reproduction of content associated with the content state information, the content state information having been updated by the information update section and indicating whether to permit the reproduction of the content.

5. A content processing device for managing content stored for reproduction, the device comprising:
a state sensing section for sensing a process execution state of a first piece of content in a process executed in accordance with user manipulation;
an information update section for updating in accordance with the process execution state sensed by the state sensing section, content state information based on which processing of at least one of the first piece of content and a second piece of content relevant to the first piece of content is controlled; and
a reproduction schedule generating section for generating, on the basis of the content state information updated by the information update section, a reproduction schedule specifying particular pieces of content and reproduction times thereof.

6. The content processing device of claim 5, wherein:
the reproduction schedule generating section includes: an update sensing section for sensing, as reproduction-forbidden content, content which is specified in the reproduction schedule and which is not permitted to reproduce due to an update of the content state information; and a substitute content detecting section for detecting, as substitute content, content which is permitted to reproduce and which has the same attribute as the reproduction-forbidden content; and
the reproduction schedule generating section generates a reproduction schedule which specifies the substitute content detected by the substitute content detecting section in place of the reproduction-forbidden content.

7. The content processing device of claim 6, wherein:
the reproduction schedule generating section further includes a potential substitute detecting section for detecting, as the substitute content, content which is permitted to reproduce and which has a different attribute from an attribute of the content specified in the reproduction schedule; and
the reproduction schedule generating section generates a reproduction schedule which specifies the substitute content detected by the potential substitute detecting section in place of the reproduction-forbidden content.

8. The content processing device of claim 6, wherein:
the reproduction schedule generating section further includes a potential substitute detecting section for detecting, as the substitute content, content which is permitted to reproduce and which has the same attribute as an attribute of the content specified in the reproduction schedule; and
the reproduction schedule generating section generates a reproduction schedule which specifies the substitute content detected by the potential substitute detecting section in place of the reproduction-forbidden content.

9. The content processing device of claim 7, wherein the potential substitute detecting section detects, as the substitute content, content which has a different attribute from an attribute of content scheduled for a predetermined time slot specified in the reproduction schedule.

10. The content processing device of claim 8, wherein the potential substitute detecting section detects, as the substitute content, content which has the same attribute as an attribute of content scheduled for a predetermined time slot specified in the reproduction schedule.

11. The content processing device of claim 1, wherein:
the process execution state of the first piece of content sensed by the state sensing means is a state in which reproduction of the first piece of content in accordance with a content reproduction command from a user has been ended; and
the information update section updates, to content state information which permits reproduction, content state information of the second piece of content which is predetermined to be reproduced after the reproduction of the first piece of content is ended.

12. A content processing device for managing content stored for reproduction, the device comprising:
a state sensing section for sensing a process execution state of a first piece of content in a process executed in accordance with user manipulation; and
information updated section for updating, in accordance with the process execution state sensed by the state sensing section, content state information based on which processing of at least one of the first piece of content and a second piece of content relevant to the first piece of content is controlled, wherein
the process execution state of the first piece of content sensed by the stated sensing section is a state in which a command for an execution of a function associated with the first piece of content has been received from a user; and
the information update section updates, to content state information which permits reproduction, content state information of the second piece of content which is predetermined to be reproduced after the function is executed.

13. The content processing device of claim 12, wherein:
the process execution state of the first piece of content sensed by the state sensing means is a state in which a command for an execution of a purchase process for a commercial good advertised in the first piece of content has been received from a user; and
the information update section updates, to content state information which permits reproduction, content state information of the second piece of content which is predetermined to be reproduced after the purchase process is executed.

14. A content processing method for managing content, the content processing method comprising the steps of:
(a) sensing a process execution state of a first piece of content in a process executed in accordance with user manipulation;
(b) updating, in accordance with the process execution state sensed in step (a), content state information based on which processing of at least one of the first piece of content and a second piece of content relevant to the first piece of content is controlled;
(c) detecting the second piece of content relevant to the first piece of content in a content storage storing content; and
(d) erasing data of the content from the content storage, wherein
in the step (c), there is detected, as the second piece of content, content having attribute information which matches attribute information of the first piece of content, the attribute information indicating an attribute of a piece of content contained for each piece of content in the content storage, and in the step (d), there is erased, on the basis of the content state information, content associated with the content state information from the content storage, the content state information having been updated by the information update section and indicating an instruction to erase the content.

15. A computer-readable storage medium having instructions stored thereon, such that when the instructions are read and executed by a processor, the processor is configured to perform the steps of:

(a) sensing a process execution state of a first piece of content in a process executed in accordance with user manipulation;

(b) updating, in accordance with the process execution state sensed in step (a), content state information based on which processing of at least one of the first piece of content and a second piece of content relevant to the first piece of content is controlled;

(c) detecting the second piece of content relevant to the first piece of content in a content storage storing content; and (d) erasing data of the content from the content storage, wherein in the step (c), there is detected, as the second piece of content, content having attribute information which matches attribute information of the first piece of content, the attribute information indicating an attribute of a piece of content contained for each piece of content in the content storage, and in the step (d), there is erased, on the basis of the content state information, content associated with the content state information from the content storage, the content state information having been updated by the information update section and indicating an instruction to erase the content.

16. The content processing device of claim 12, wherein:

the process execution state of the first piece of content sensed by the state sensing means is a state in which a command for an access to an address indicated by the first piece of content has been received from a user; and the information update section updates, to content state information which permits reproduction, content state information of the second piece of content which is predetermined to be reproduced after the access to the address is executed.

17. A content processing device for managing content stored for reproduction, the device comprising:

a content storage for storing content;

a state sensing section for sensing a process execution state of a first piece of content in a process executed in accordance with user manipulation;

an information update section for updating, in accordance with the process execution state sensing by the state sensing section, content state information based on which processing of at least one of the first piece of content and a second piece of content relevant to the first piece of content is controlled, said second piece of content being different from the first piece of content; and a detecting section for detecting the second piece of content relevant to the first piece of content in the content storage, wherein the content storage editably stores attribute information for grouping pieces of content in accordance with relativity and continuity concerning what the content is, said attribute information corresponding to each piece of content, and the detecting section detects, as the second piece of content, a piece of content, having attribute information which matches attribute information of the first piece of content, out of pieces of content which are stored in the content storage.

* * * * *